United States Patent [19]

Meurer

[11] Patent Number: 5,736,037
[45] Date of Patent: Apr. 7, 1998

[54] FOLDABLE TUBE SETTLER AND METHOD OF INSTALLING TUBE SETTLER

[76] Inventor: Charles Lonnie Meurer, 2389 Bitterroot La., Golden, Colo. 80401

[21] Appl. No.: 705,421

[22] Filed: Aug. 29, 1996

[51] Int. Cl.[6] .................................................. B01D 21/02
[52] U.S. Cl. .......................... 210/232; 210/521; 210/541; 29/450
[58] Field of Search .............................. 210/802, 232, 210/521, 522, 532.1, 541; 29/239, 897.31, 450

[56] References Cited

U.S. PATENT DOCUMENTS

| | | | |
|---|---|---|---|
| 3,399,135 | 8/1968 | Conley et al. | 210/42 |
| 3,491,892 | 1/1970 | McCann | 220/621 |
| 3,613,889 | 10/1971 | Reed | 210/84 |
| 3,615,025 | 10/1971 | Rice | 210/521 |
| 3,640,387 | 2/1972 | Conley et al. | 210/73 |
| 3,666,112 | 5/1972 | Pielknrood et al. | 210/521 |
| 3,797,668 | 3/1974 | Pielkenrood et al. | 210/522 |
| 3,837,501 | 9/1974 | Pielkenrood | 210/522 |
| 3,852,199 | 12/1974 | Wachsmuth et al. | 210/522 |
| 3,898,164 | 8/1975 | Hsiung | 210/521 |
| 3,903,000 | 9/1975 | Miura | 210/251 |
| 3,925,205 | 12/1975 | Sparham | 210/73 |
| 3,951,817 | 4/1976 | Snyder | 210/521 |
| 3,963,624 | 6/1976 | Henderson et al. | 210/521 |
| 3,975,276 | 8/1976 | Schmid | 210/207 |
| 3,997,444 | 12/1976 | Mcgivern | 210/242 |
| 4,045,344 | 8/1977 | Yokota | 210/106 |
| 4,122,017 | 10/1978 | Tanabe et al. | 210/522 |
| 4,136,012 | 1/1979 | Louboutin | 210/208 |
| 4,184,954 | 1/1980 | Peterson | 210/83 |
| 4,194,976 | 3/1980 | Robinsky | 210/521 |
| 4,221,671 | 9/1980 | Meurer | 210/522 |
| 4,337,561 | 7/1982 | James | 210/521 |
| 4,346,005 | 8/1982 | Zimmerman | 210/232 |
| 4,514,303 | 4/1985 | Moore | 210/521 |
| 4,559,141 | 12/1985 | Gyulavari | 210/521 |
| 4,783,255 | 11/1988 | Bogusch | 210/802 |
| 4,793,926 | 12/1988 | Vion | 210/521 |
| 5,028,333 | 7/1991 | Wright et al. | 210/521 |
| 5,089,136 | 2/1992 | Cyr | 210/519 |
| 5,217,614 | 6/1993 | Meurer | 210/521 |

Primary Examiner—Christopher Upton
Attorney, Agent, or Firm—C. E. Martine, Jr.

[57] ABSTRACT

A foldable assembly is provided for a module of settler tubes which settle solids from liquid. The module has a minimum thickness for shipment and a normal thickness for use in settling the solids, where the minimum thickness is substantially less than the normal thickness. The tubes are defined by four opposing walls. The assembly includes a pair of sheets, each of the sheets having dimensions along major and minor orthogonal axes, where the axes are perpendicular to the direction of the thickness and the sheets define two of the walls of one of the tubes. Another wall of the tubes is defined by an interconnect member having a central section defined by opposite sides, and a flex joint on each of said opposite sides and securing each of the sides to a respective one of the sheets. The other wall extends from each of the sheets in the direction of the thickness of the module when the tube is open to receive the liquid and the solids. In one embodiment, each of the flex joints is flexible to permit relative angular movement between the respective central section and the sheets to allow the sheets to move toward each other and change the direction in which the other wall extends, which changed direction is generally parallel to the sheets to provide the minimum thickness for shipment. In another embodiment all of the sheet, the interconnect members and the joints are made of flexible material.

27 Claims, 14 Drawing Sheets

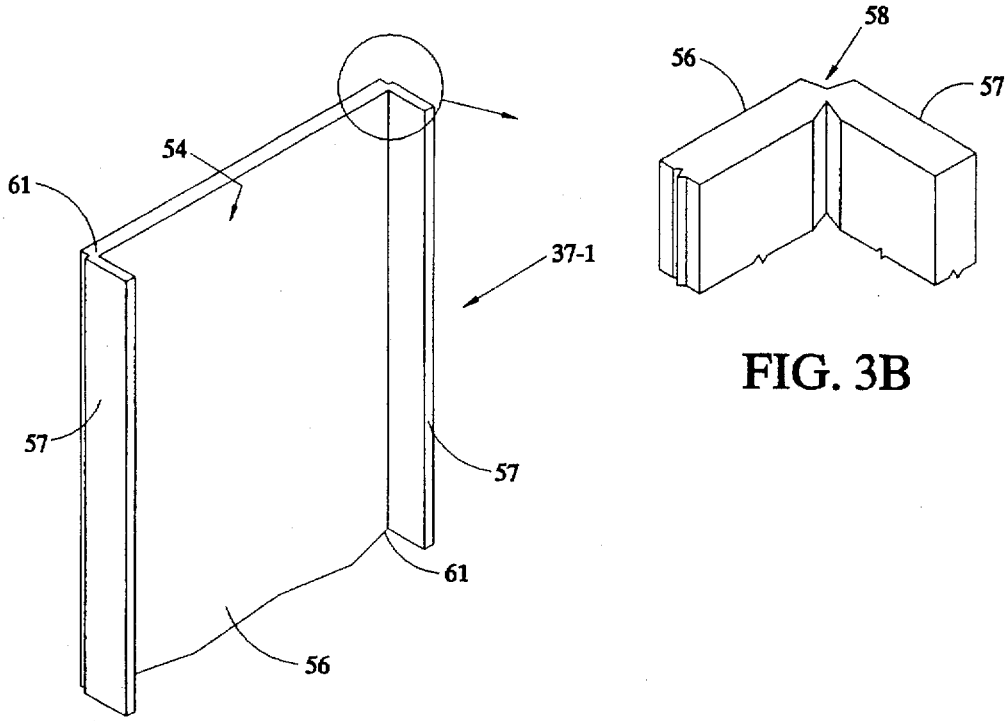
FIG. 3A
FIG. 3B
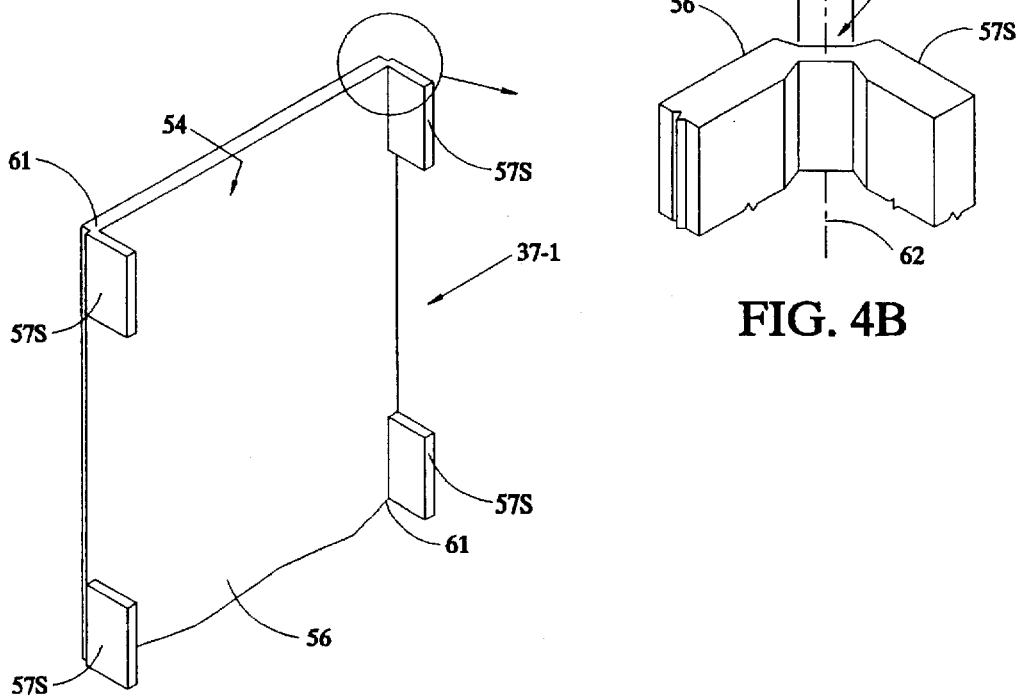
FIG. 4A
FIG. 4B

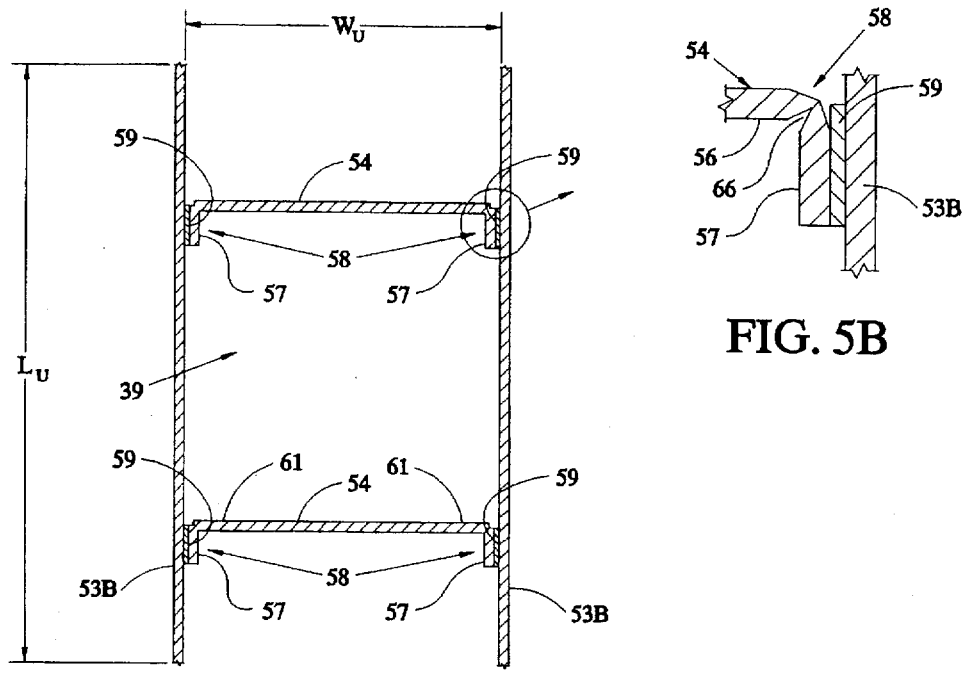
FIG. 5B
FIG. 5A
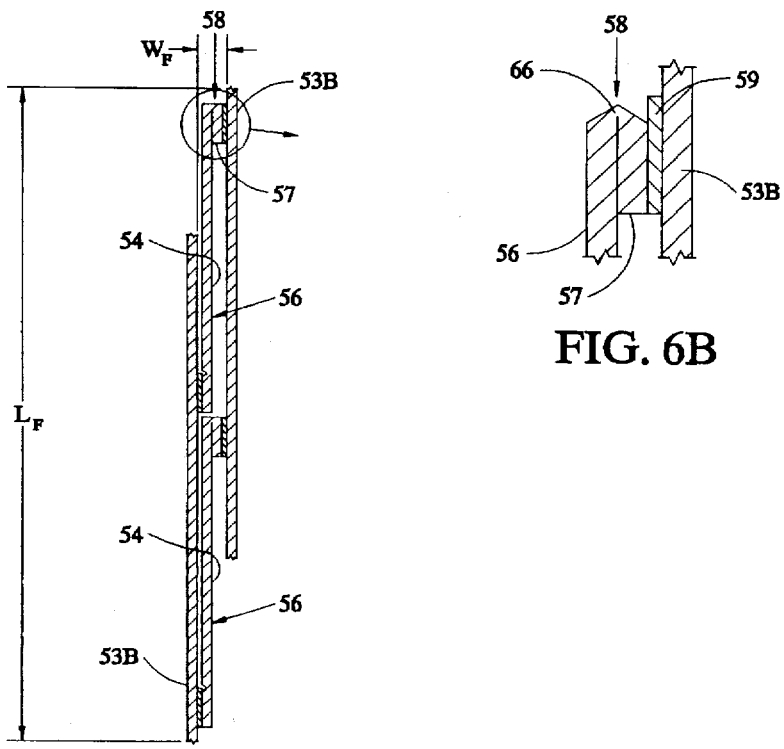
FIG. 6B
FIG. 6A

FOLDABLE TUBE SETTLER AND METHOD OF INSTALLING TUBE SETTLER

BACKGROUND OF THE INVENTION

1. Field of the Invention

This invention relates to removal of solids from liquid, and more particularly, to a tube settler which is foldable into a compact, closed-tube configuration for transport to an installation site and unfoldable into an open-tube configuration at the site for settling the solids from the liquid.

2. Discussion of Prior Tube Settlers

Settlers remove certain materials and particles from liquid, to clarify the liquid. These materials are suspended in the liquid and can be removed under the force of gravity when the flow of the liquid is substantially reduced, as in a very low flow, or quiescent, zone (or flow channel). Since these materials are generally solid and are said to "settle" out of the liquid, they are referred to as "settleable solids", or "settleable particulates". Settleable solids may include naturally occurring materials (e.g., clay, silts, sand and dirt), chemical precipitants and biological solids. The word "solids" as used herein to describe the present invention refers to such settleable solids and settleable particulates.

Settlers are used, for example, in water and waste water treatment plants. In water treatment, the water drawn from a water supply has various non-settleable colloidal solids therein. When mixed with chemicals, the colloidal solids and chemicals agglomerate to form solids. In waste water treatment, the solids include organic solids, among other wastes. Water and waste water are treated in settlers to remove such solids, thereby making the water clear and suitable for use, reuse, or for further treatment, such as tertiary treatment. The word "liquid" as used herein to describe the present invention refers to water and waste water.

An object of water and waste water settlers is to create quiescent zones having low flow rates to promote maximum settlement of solids to the bottom of the settlers. Settlers typically include a large detention basin where the settlement of the solids occurs. If the cost of land area is low, settlers in the form of very large area (footprint) ponds or basins are used. Where land is more expensive, flat plates mounted at a fixed angle or at variable angles relative to the surface of the liquid are used to form many thin flow channels to create quiescent zones within the detention basin in an attempt to promote settling of solids in less time using less land area. For example, inclined settler plates have been held assembled by stems, as in U.S. Pat. No. 3,903,000 to Miura issued Sep. 2, 1975. However, such plates are expensive relative to the cost of tube settlers. For example, the plate settlers require more structural support than tube settlers and must be bounded by side baffles.

Therefore, numerous designs have been proposed for tube settlers. One type tube settler, as shown in McCann U.S. Pat. No. 3,491,892 issued on Jan. 27, 1970, uses parallel sheets or walls spaced by parallel baffles which form inclined conduits, or the flow channels. The sheets and baffles have been made from rigid plastic or metal, and have been secured to each other to form the tubes and such flow channels, as by use of adhesive to join the plastic sheets and baffles, or soldering or welding of the metal sheets and baffles. In a design based on that of the McCann Patent, U.S. Pat. No. 3,898,164, to Hsiung issued Aug. 5, 1975 describes a self-supporting tube settler using extrusions which are adhesively attached to each other to form the tubes. Other variations of the design of tube settlers include providing connectors having grooves for receiving elements which form the tubes, as in U.S. Pat. No. 3,963,624 to Henderson, et al.

Other examples of this type of tube settler are shown, for example, in U.S. Pat. Nos. 3,615,025, to Rice et al. issued Oct. 26, 1971; 3,640,387, to Conley, et al. issued Feb. 8, 1972; 3,666,112, to Pielkenrood et al. issued May 30, 1972; 3,797,668 to Pielkenrood et al. issued Mar. 19, 1974; 3,925,205 to Sparham issued Dec. 9, 1975; 3,975,276, to Schmidt issued Aug. 17, 1970; 3,997,444 to McGivern issued Dec 14, 1976; 4,122,017, to Tanabe et al. issued Oct. 24, 1978; 4,184,954, to Peterson issued Jan. 26, 1980; 4,346,005 to Zimmerman issued Aug. 24, 1982; 4,559,141, to Gyulavari issued Dec. 17, 1985; 4,221,671, to Applicant; 4,783,255, to Bogusch issued Nov. 8, 1988; and 5,089,136, to Cyr issued Feb. 18, 1992.

In Applicant Meurer's U.S. Pat. No. 5,217,614 issued Jun. 8, 1993, trusses have been provided for supporting tube settlers. Also, tube settler units with the tubes in the open, tubular configuration have been shown as being adapted to be removed as a unit from a basin, as in U.S. Pat. No. 4,136,012 to Louboutin issued Jan. 23, 1979.

One general type of tube settler has been designed for assembly at the site. For example, in U.S. Pat. No. 3,951,817, to Snyder issued Apr. 20, 1976, extruded plates have been assembled at the site. Also, in U.S. Pat. No. 3,852,199, to Wachsmuth et al issued Dec. 3, 1974, a minimum number of parts have been used to assemble separate tube settler modules, which modules are smaller than the settler basin in which they are to be used. The separate modules are abutted with other such modules at the site to provide the necessary larger tube settler assembly. However, the settler module there shown is made entirely from rigid planar members and ribbed tube-defining members assembled via slots to define the tubes of the tube settler. Further, much of the success of tube settlers that are designed to be assembled at the site depends on having skilled laborers available at the site.

Further, in the type of prior tube settler that is assembled at a factory and shipped assembled to the site, in Applicants' experience, such assembled tube settlers have not been provided with an integral tube settler module assembled at the factory and shipped to the site in a configuration so as to take up minimum space during shipping, and then (still as an integral module) transformed into an open configuration for use. Rather, tube settlers that are fabricated at a factory have integral units having the open tubes formed in place. With the tubes open, such settlers are shipped to the installation site, e.g. a waste water treatment basin. With the open tubes formed prior to and during shipment, such integral tube settler modules have a three-dimensional shape which is substantial in each of the three dimensions and takes up substantial volume. For example, a typical tube settler may have overall dimensions of 3.5 feet in height by 10 feet in length (to span the distance between supports) by 4 feet in width. Because much of the volume of these conventional tube settlers is the open tubes (i.e., air), they are relatively expensive to ship, as by containers used for overseas shipments. As a result, there is still a need to provide a factory-assembled tube settler module having a configuration suitable for efficient shipping to the basin in which the tubes are to be used, but which upon arrival at the basin is easily transformable without skilled labor into such

SUMMARY OF THE PRESENT INVENTION

Applicants have studied prior tube settlers in an endeavor to improve on the efficiency of shipping pre-assembled tube settlers to the site of use. Such studies indicate that in shipping tube settlers to the site of basins, one should not assume that skilled workers will be available at the site to assemble the tube settlers. At remote locations in previously undeveloped areas, for example, such skilled workers are not readily available, which causes delays, lowers the quality of the assembled tube settlers and increases costs.

Rather, Applicants have determined that the design of the pre-assembled tube settler must provide for significant reduction in the size of the pre-assembled tube settler during shipping, but be readily and easily expandable by unskilled workers into such open-tube configuration for use at the site.

The present invention seeks to overcome the disadvantages of prior tube settlers by providing an integral tube settler which is foldable into a minimum configuration for shipment while retaining the integral structure, yet is readily and easily expandable by unskilled workers into an unfolded, open-tube configuration for use in a basin. The present invention provides these features in a foldable tube settler module having a folded configuration defining a first volume, and an unfolded configuration defining a second volume larger than the first volume. The tube settler module is provided with a pair of beam sheets. Each of the beam sheets is of generally two dimensions having a major (or x) axis and a minor (or y) axis. There are interconnect members between the beam sheets having a central section and a tab secured to each edge of the section to define tubes extending diagonally along the height of the tube settler. In one embodiment of the present invention, the sheets and the interconnect members are made from flexible material which may be assembled at a factory by connecting the tabs to the beam sheets. The beam sheets and the members are a foldable unit which may have a generally two-dimensional configuration for shipment, and which upon arrival at the site is pulled and held taut in an unfolded, three-dimensional configuration to form the tube settler. Reference to the "folded" configuration indicates that the tubes are closed, ready for shipment, whereas reference to the "unfolded" configuration indicates that the tubes are open, ready for use.

In another embodiment of the present invention, the beam sheets and/or the interconnect members may be made from rigid material, and a flex joint connects each of the tabs to a respective one of the edges of the central section. A bond is made between each of the tabs and a respective one of the beam sheets. The bonds cooperate to position the central section to extend diagonally between the beam sheets. The interconnect members position the beam sheets apart by a first distance in the folded (or closed-tube) configuration, and apart by a second distance in the unfolded (or open-tube) configuration of the settler module. The flex joints are flexible (relative to the rigidity of the beam sheets and/or interconnect members) to permit movement between the beam sheets in the plural directions of the major axis and the minor axis and toward each other to permit the tube settler module to assume the folded, closed-tube configuration. In this embodiment of the present invention, the tube settler module has a primarily two-dimensional configuration in the folded, closed-tube configuration and an unfoldable, closed-tube third dimension. The module has a substantial three-dimensional configuration in the unfolded, open-tube configuration in which the third dimension (or z axis) is increased to form the open tubes and allow the flow of particulate-laden liquid into the tubes of the module. In the three-dimensional configuration, the interconnect members are generally perpendicular to each beam sheet and extend across substantially all of the second dimension. The flex joints of a particular one of the members are sufficiently flexible, however, to permit movement between the beam sheets along both the major axis and the minor axis and toward each other into a position in which the interconnect members are generally parallel to the beam sheets, which reduces the value of the third dimension and allows the tube settler module to be in the folded configuration.

With these features of the present invention in mind, it may be understood that the present invention contemplates an integral tube settler module having a folded configuration with closed tubes for efficient reduction of space used in shipping to the site of a settler basin, and an unfolded configuration with open tubes for use in settling solids from liquid.

The present invention also contemplates an integral tube settler module having a first dimension (or length) spanning spaced supports, and a second dimension (or height) defining the distance over which gravity may act on the solids, and a third dimension (or width), which is foldable and reducible for efficient shipment, and extendible for the settling operation.

The present invention further contemplates an integral tube settler module in which one dimension of a three dimensional volume is reducible by flexing joints between side sheets and cross members which cooperate to define the tubes, wherein the tubes close upon flexing of the joints to reduce the one dimension, and the tubes open upon reversing the direction of flexing to open the tubes.

The present invention additionally contemplates an integral tube settler in which a support is under each opposite end of the tube settler and a tie rod extends through the tube settler to maintain the settler tubes in an open position after transport to the support with the tubes in a closed position.

With these and other features in mind, one embodiment of the present invention includes an integral tube settler module foldable into a small configuration for shipment and which is expandable by unskilled workers into the unfolded, larger configuration for use in the basin. The folded configuration defines a first, or small volume. The unfolded, open-tube configuration defines a second volume larger than the first volume. The tube settler module has a pair of beam sheets, each being generally two dimensional and having an x (length) axis and a y (height) axis. Between the beam sheets there are at least two interconnect members each having a central flow section, a tab at each edge of the section, and a flex joint joining each of the tabs to a respective one of the edges of the central section. A tab and a respective one of the beam sheets are bonded together and position the central section to extend diagonally between the beam sheets. The interconnect member positions the beam sheets apart by a first, relatively small distance in the folded configuration, and by a second, relatively large distance in the unfolded, open-tube configuration of the settler module. The joints are flexible to permit movement between the beam sheets in the plural directions of the length and the height and toward each other to permit the tube settler module to assume the folded configuration. The flexibility of the flex joints also permits movement between the beam sheets in the directions of the length and the height and away from each other to permit the tube settler module to assume the unfolded configuration.

BRIEF DESCRIPTION OF THE DRAWINGS

Other features and advantages of the present invention will be apparent from an examination of the following detailed descriptions, which include the attached drawings in which:

FIG. 3A is an enlarged view of one embodiment of the webs showing elongated tabs for connecting the web to the sheets;

FIG. 3B is an enlarged view of the area in a circle in FIG. 3A depicting a flexible joint between the tab and the sheet;

FIG. 4A is an enlarged view of another embodiment of the webs showing short tabs;

FIG. 4B is an enlarged view of the area in a circle in FIG. 4A depicting an elongated flexible joint between the tab and the sheet;

FIG. 5A is a cross sectional view taken along line 5A—5A in FIG. 2A showing one of the tubes open when the module is in the unfolded configuration and revealing a generally square cross section of one embodiment of the tube settler module;

FIG. 5B is an enlarged view of the area in a circle in FIG. 5A depicting a flexible joint between each tab and the sheets;

FIG. 6A is a cross sectional view taken along line 6A—6A in FIG. 2B showing the tube of FIG. 2A now closed as shown in FIG. 2B when the tube settler module is in the folded configuration for shipment;

FIG. 6B is an enlarged view of the area in the circle in FIG. 6A depicting a flexible joint;

DETAILED DESCRIPTION OF THE PREFERRED EMBODIMENTS

Tube Settler 25

Figure 1A:
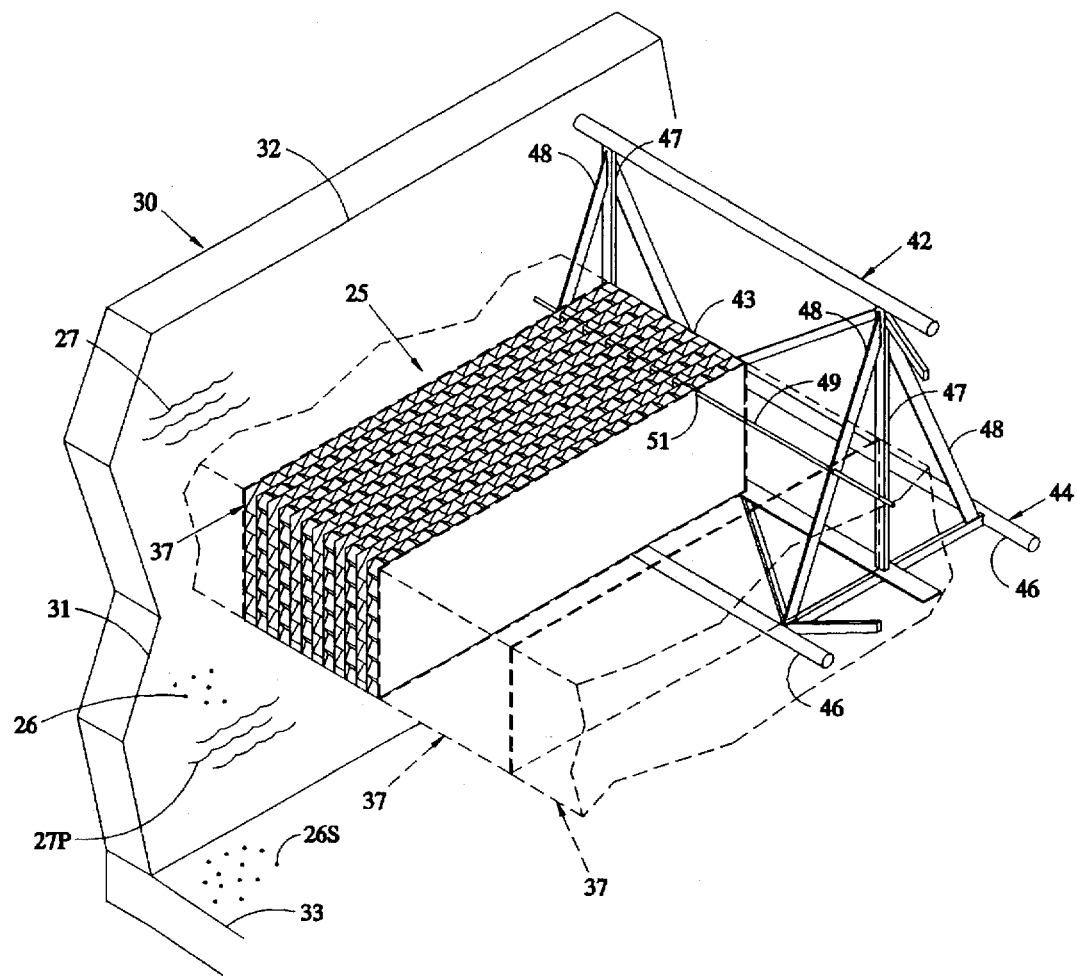
FIG. 1A is a three dimensional, schematic view of a basin for settling settleable solids from liquid, wherein a truss is shown located at an end of a tube settler module which is foldable according to the teachings of the present invention.
Figure 1B:
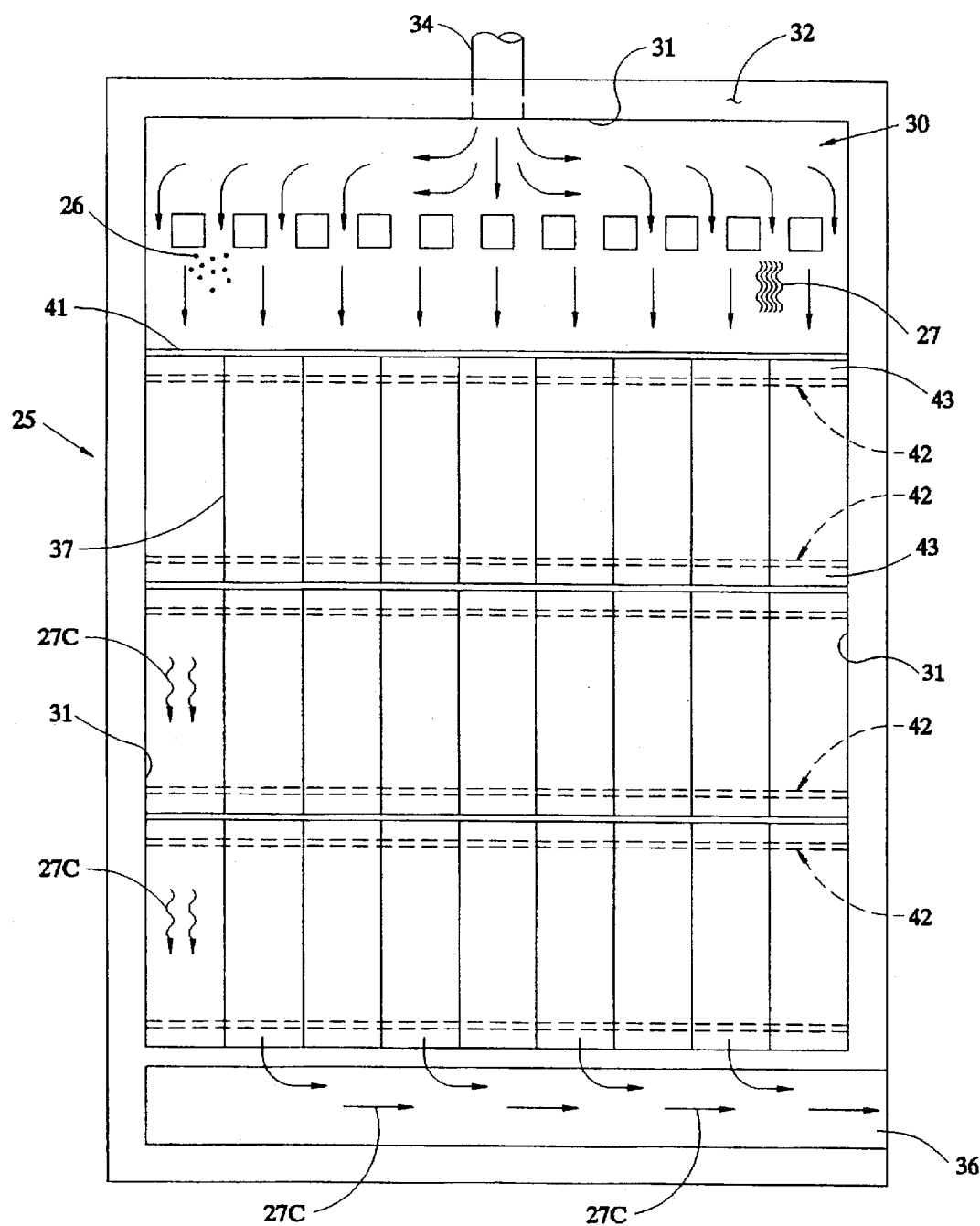
FIG. 1B is a plan view of the settling basin shown in FIG. 1A, wherein a truss is shown located at each end of a plurality of adjacent tube settler modules, and each such module is foldable according to the teachings of the present invention.

Referring to FIGS. 1A and 1B, a settler 25 is shown for removing materials such as solids 26 or particles from liquid 27 or fluid, which is referred to as particle-laden liquid, or liquid 27P. The solids 26 may be settleable solids, and the liquid 27 may be water or waste water, for example. The settler 25 is shown installed in a basin 30 which has vertical outer walls 31, an open top 32 and a bottom 33. One embodiment of the present invention is shown used with a rectangular basin 30, whereas other embodiments of the present invention may be used with circular or square basins (not shown).

Figure 2A:
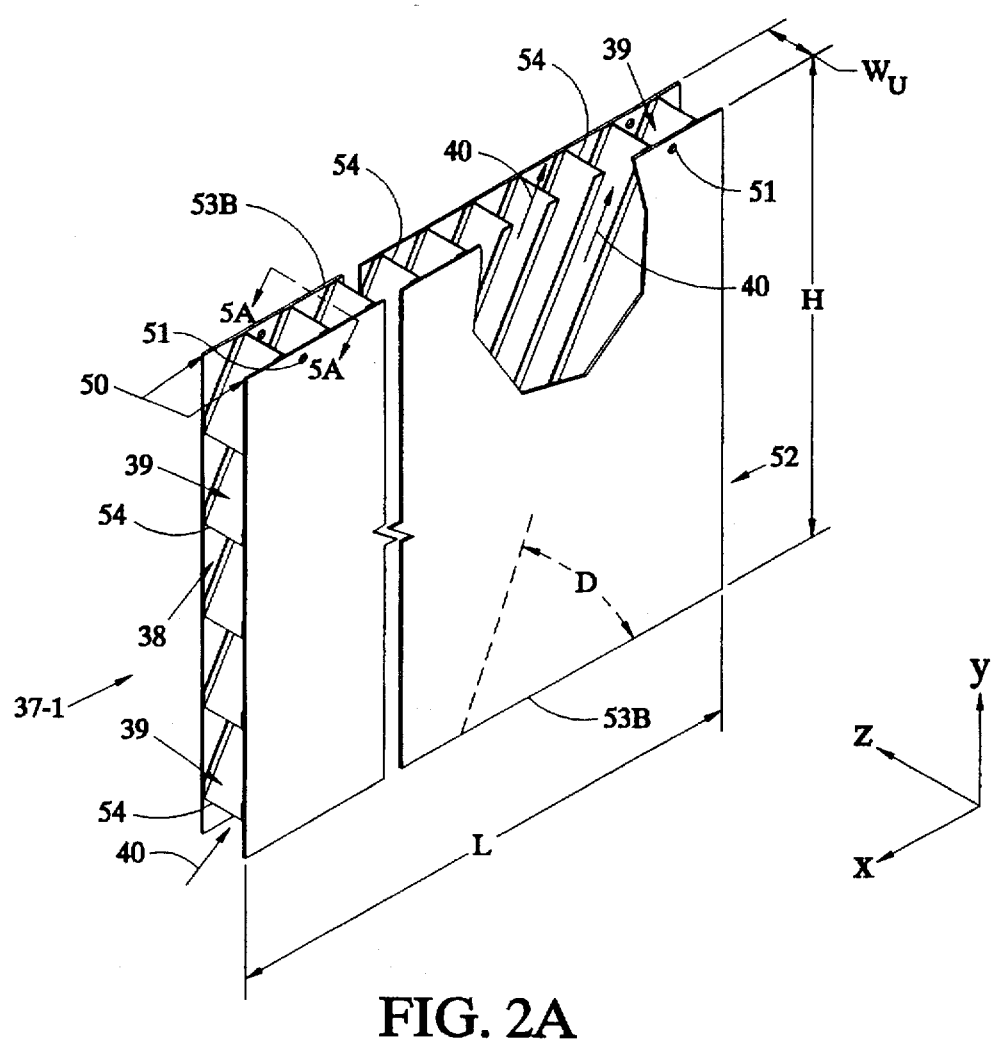
FIG. 2A is an enlarged three dimensional,schematic view of an unfolded configuration of a portion of the tube settler module shown in FIG. 1A, wherein the portion is shown having spaced beam sheets and intermediate members, or webs, integral with the sheets for defining open flow channels or tubes to guide the liquid and the settleable solids in the basin.
Figure 2B:
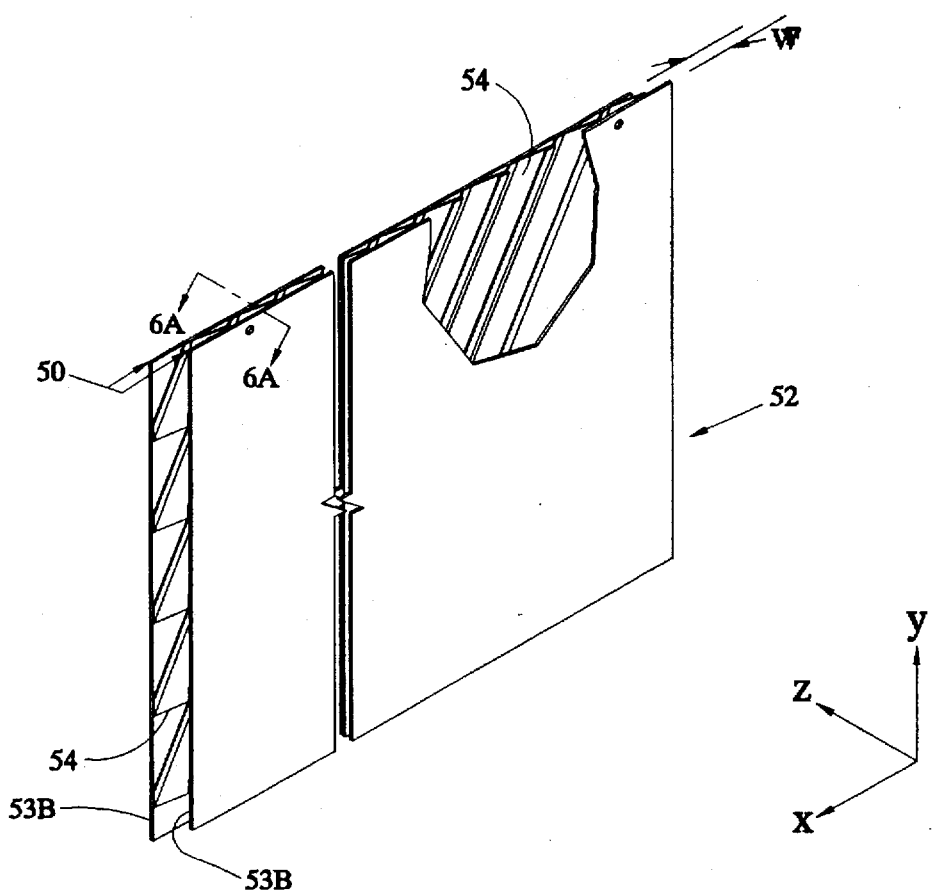
FIG. 2B is a view of the portion of the settler shown in FIG. 2A, wherein the portion is shown having the spaced sheets and the webs integral therewith, the portion being shown in a folded configuration in which the flow channels are closed for shipment of the tube settler module to the basin from an assembly site such as a factory (not shown)
Figure 2C:
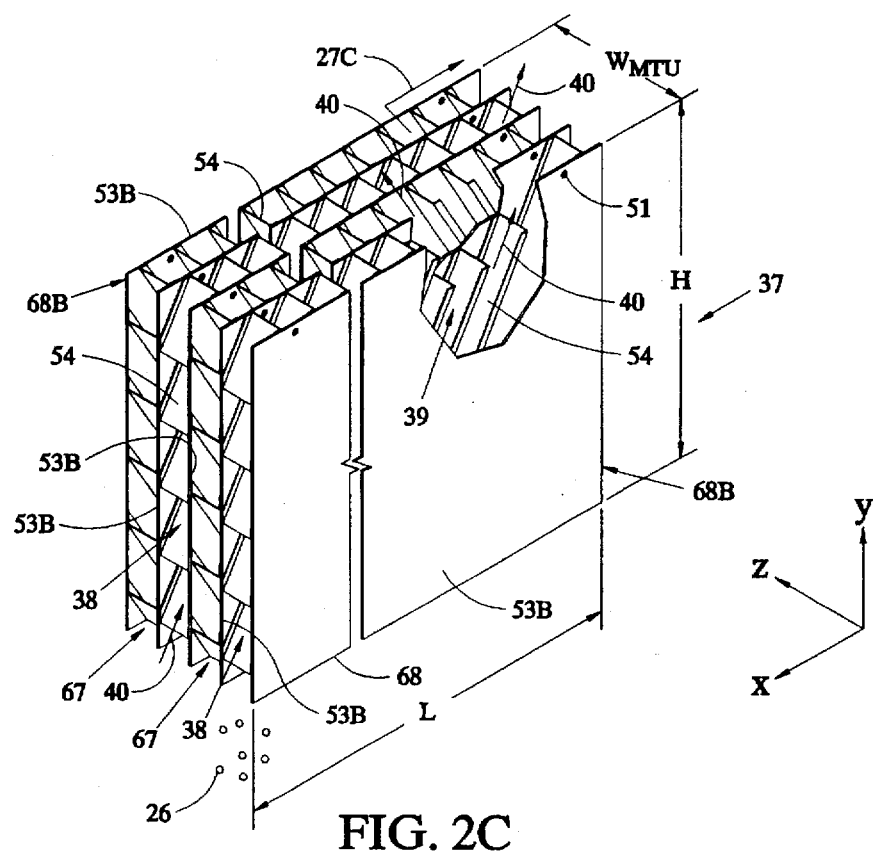
FIG. 2C is an enlarged three dimensional, schematic view of the entire tube settler module shown in FIGS. 1A and 1B, formed from joining many of the portions shown in FIGS. 2A and 2B, wherein alternate ones of such portions have webs extending in opposite diagonal directions and defining the open flow channels to guide the liquid and settleable solids in opposite diagonal directions in an unfolded, open-tube configuration, wherein the width of the module in the direction of a z axis is that of a standard tube settler.

As shown in FIG. 1B, the liquid 27 and the solids 26 flow through the basin 30 from an inlet 34 to an outlet 36, with the flow being substantially reduced in tube settler modules 37 (referred to as "modules") of the settler 25 of the present invention. Referring to FIG. 2C, each module 37 provides many very low flow rate, or quiescent, zones or channels 38 which are defined by tubes 39 (FIGS. 2A and 2C). The liquid 27P may flow upwardly in the tubes 39 in the direction of arrows 40 so that the settleable solids 26 settle out of the liquid 27. The resulting clarified liquid 27C (FIGS. 1B and 2C) flows to the outlet 36 (FIG. 1B), whereas the settled solids 26S settle to the bottom 33. A head baffle 41 (FIG. 1B) causes the flowing liquid 27P and the solids 26 suspended therein to flow under the tube settler modules 37 and enter the tubes 39 adjacent to the bottom 33 for upward flow during which such settling of the solids 26 takes place.

Truss 42

As shown in FIGS. 1A and 1B, each tube settler module 37 is elongated and in a self-supporting manner spans the distance between supports, which may be in the form of trusses 42. A tube settler module 37 of the settler 25 has opposite ends 43, one of which is supported by one of the trusses 42. In FIG. 1A, adjacent tube settler modules 37 are shown in dashed lines supported on the truss 42. The truss 42 may be as described in Applicant Meurer's U.S. Pat. No. 5,217,614, issued Jun. 8, 1993, and incorporated herein by this reference. The truss 42 has a base 44 including a pair of pipes 46, central posts 47 and diagonal braces 48 extending from the posts 47 to respective ones of the pipes 46. A tie down rod 49 extends from one diagonal brace 48, through apertures 51 in the tube settler module 37, to an adjacent brace 48.

Embodiments of Tube Settler Modules 37

Figure 12A:
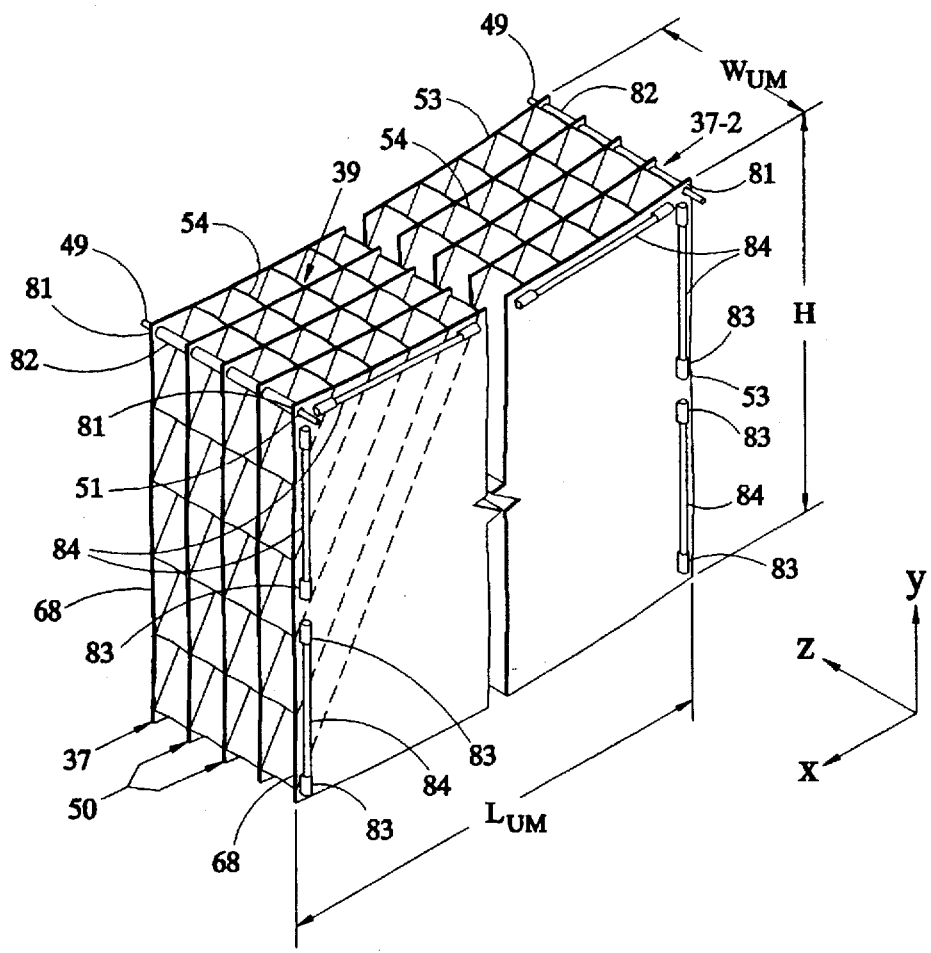
FIG. 12A is a three dimensional, schematic view of another embodiment of the tube settler module shown in FIG. 1A, in which all of the elements of the module may be made of flexible material and the opposite corners of outer sheets of the module have eyelets to receive supports which hold the flexible material taut in the unfolded configuration.

Referring to FIG. 2A, there is shown a first embodiment 37-1 of the present invention in the form of unfolded portions 52 of a tube settler module 37 which is foldable into a minimum, or folded, configuration (FIG. 2B) for shipment while retaining an integral structure of the tubes 39. Referring also to FIG. 12A, there is shown a second embodiment 37-2 of the present invention in the form of an unfolded tube settler module 37, which is also foldable into a minimum, or folded, configuration (FIG. 12B) for shipment while retaining such integral structure of the tubes 39. These embodiments of the tube settler module 37 have the features of being completely assembled and folded at the factory where skilled workers are available, yet being readily and easily unfolded (or expanded) at the site of the basin 30 by unskilled workers into the unfolded configuration shown in respective FIGS. 2A and 12A for installation in the basin 30. The folded configuration defines a first volume (defined by dimensions along orthogonal x, y and z axes). The unfolded configuration defines a second volume (defined by dimensions along the same orthogonal x, y and z axes).

In both the first and second embodiments, the tube settler module 37 is provided with at least a pair of sheets 53. The sheets 53 shown, for example, in FIGS. 2A, 2B, 5A, 6A and 9 are referred to as beam sheets 53B due to the self-supporting nature of these sheets, which permits such beam sheets 53B to span the distance, such as about nine feet, between the pipes 46 of the adjacent trusses 42. Each of the sheets 53 is generally two dimensional, having a major (or x) axis designed so that upon installation a length dimension L along the x axis will span the distance between the trusses 42. The sheets 53 also have a minor (or y) axis designed so that upon installation a height dimension H along the y axis corresponds to the vertical distance in which the liquid 27P flows upwardly in the module 37 against the force of gravity.

Interconnect members, or webs 54, are joined to opposite or adjacent) sheets 53. A pair of interconnect members 54 defines part of one of the tubes 39. As shown in FIGS. 3A and 4A, in the first embodiment of the tube settler module 37-1, each interconnect member 54 has a central section 56, one or more tabs 57, and a joint 58 at an edge or side 61 of the central section 56 to connect the central section 56 to the tabs 57. Each tab 57 is bonded to one of the sheets 53. The central section 56 is designed so that upon installation of the tube settler module 37 in the basin 30, the central section 56 extends in the direction of the width of the module 37 along the z axis. Each of the tabs 57 positions the central section 56 to extend diagonally between the sheets 53 relative to the x axis and y axis. The diagonal may be at a standard angle D (FIG. 2A) of from 55 to 60 degrees from horizontal.

Considering the portion 52 shown in FIG. 2S and the module 37-2 shown in FIG. 12S, the pair of webs 54 is effective to allow two adjacent ones of the respective sheets 53S and 53 to be closely spaced apart by a first width $W_F$ (FIG. 2S) in the folded (closed-tube) configuration which is used for shipment. As shown in FIGS. 2A and 12A, the webs 54 also limit the width $W_U$ in the z direction at which the adjacent sheets 53 may be apart to define the open tubes 39 in the unfolded (open-tube) configuration, which is the settling configuration of these embodiments of the respective first and second embodiments 37-1 and 37-2 of the tube settler module 37. As described below and shown in FIG. 12S, the second embodiment of the tube settler modules 37-2 may also be folded by folding sheets 53-2 onto themselves to reduce the length L to a short length $L_F$, as well as by folding the webs 54, designated 54F in FIG. 12B.

Tubes of the Tube Settler Module 37

First Embodiment 37-1

For clarity of description, the portion 52 of the module 37-1 is shown including one pair 50 of beam sheets 53B and multiple numbers of webs 54. These are described in connection with FIGS. 2A, 2B, 5A and 6B. To form one tube 39 of the module 37-1, two of the beam sheets 53B and two of the webs 54 are used. The beam sheets 53B and the webs 54 are made from relatively rigid material. The joints 58 (FIGS. 3A, 3B, 4A, 4B, 5A, 5B, 6A and 6B) of the web 54 are made from material that is flexible as compared to the rigid material from which the sheets 53 and the webs 54 are made. As shown in FIGS. 5A and 5B, each tab 57 is secured to one of the beam sheets 53B by a bond 59. The bond 59 extends in the diagonal direction shown in FIGS. 2A and 2B, which may provide the tubes 39 with a slope of from 55 to 60 degrees from horizontal, for example. With the tabs 57 holding or securing each side 61 of each web 54 to a respective beam sheet 53B, adjacent webs 54 cooperate to form one of the tubes 39 through which the liquid 27P and the solids 26 flow.

Each joint 58 may bend, or flex, to permit the tube settler module 37-1 to be folded from the unfolded, right-angle configuration shown in FIG. 5A, to the folded, U-shaped configuration shown in FIG. 6A. As the joints 58 flex or bend to allow the tube settler module 37-1 to assume the folded, U-shaped configuration, the central sections 56 of the webs 54 move into a position extending along, and are close to, the beam sheets 53B. The flexing or bending of the joints 58 is thus effective to permit the two adjacent beam sheets 53B of the pair that form the tube 39 to move toward each other in the direction of the z axis to reduce the value of the width W to the folded width $W_F$.

Figure 16:
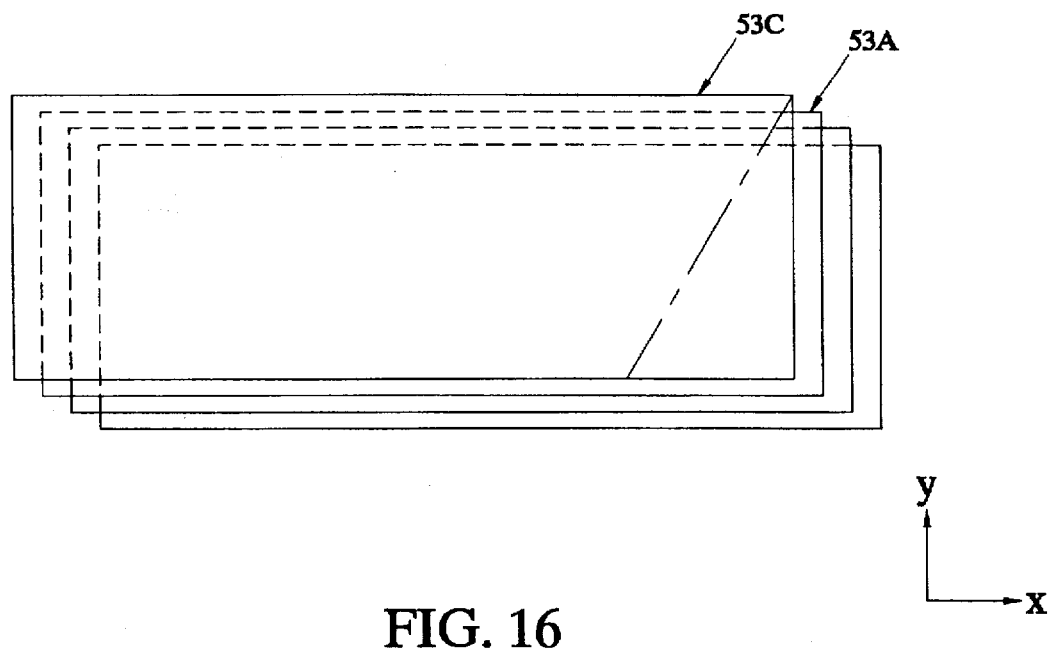
FIG. 16 is a side view of the embodiment of the tube settler module shown in FIGS. 2C and 2D in the folded configuration showing the movement of the beam sheets in both the x and y axis directions wherein the beam sheets become offset from each other.

Referring to FIG. 16, it may be understood that due to the diagonal direction of the bonds 59, the movement between the beam sheets 53B is perpendicular to an axis 62 (FIG. 4B) of the joint 58. That is, such movement is perpendicular to the direction of the diagonal bond 59 between the beam sheets 53B and the tabs 57. In the fabrication of the tube settler module 37, the bonds 59 are made parallel to each other so that the axes 62 are also parallel to each other. In this manner, as the tube settler module 37 is folded or unfolded, the joints 58 remain aligned with each other. In actual manufacturing operations, the bonds 59 may not be exactly parallel, such that the axes 62 of the joints 58 may not be parallel. To permit the joints 58 of the tube settler module 37 to fold without binding when the axes 62 of the joint 58 are not exactly parallel, the joint 58 may extend on both sides of the axis 62 (FIG. 4B) toward the tab 57 (shown as tab 57S) and the central section 56. In this manner, although the midpoints of the joints 58 are not parallel, there is enough material of each joint 58 between the tab 57 and the central section 56 to have an axis 62 on which one joint 58 bends or flexes be parallel to an axis 62 on which the other joint 58 bends or flexes. Any of the joints 58 described herein (e.g., the joint 58 in FIG. 3B) may be elongated in this manner.

As shown in FIG. 16, this movement between the beam sheets 53B in the plural directions of the x axis and the y axis may be said to be multidirectional and result in the beam sheets 53B on one side 61 of the webs (see sheet 53A in FIG. 16) becoming offset in the direction of the x and y axes relative to the beam sheet 53C on the other side 61 of the webs (see sheet 53C in FIG. 16) when the module 37 is in the folded configuration.

After such bending or flexing of the joints 58 to permit the tube settler module 37 to assume the folded configuration shown in FIG. 6A and having the width $W_F$, the flexibility of the flex joints 58 may be used and the movement reversed between the beam sheets 53B in the directions of the x axis and the y axis, and in the direction of the z axis. In such reverse flexing, the webs 54 move from the U-shaped configuration shown in FIG. 6A and the beam sheets 53B move away from each other in the direction of the z axis to permit the portion 52 of the tube settler module 37-1 to assume the unfolded configuration shown in FIG. 5A as having the width $W_U$. The folded width $W_F$ is substantially less than the unfolded width $W_U$ (e.g., ten times).

For purposes of description, such bending or flexing of the joints 58 of the first embodiment 37-1 of the tube settler module 37, which results in such reduction of the unfolded width $W_U$ to the folded width $W_F$, is referred to as "folding" of the first embodiment 37-1 of the tube settler module 37. The reverse process to increase the folded width $W_F$ to the unfolded width $W_U$ is referred to as "unfolding" of the first embodiment 37-1 of the tube settler module 37. Although the sheets 53B and the webs 54 are rigid relative to the joints 58, such folding and unfolding is permitted to reduce or increase the width W of the tube settler module 37-1.

Second Embodiment 37-2 of Tube Settler Module 37

In the second embodiment 37-2 of the tube settler module 37 (shown in FIGS. 12A and 12B) at least the joints 58 of each web 54 are made from flexible material. Preferably all of each web 54, and all of each sheet 53, is also made from flexible material, in which case the tab 57 and the joint 58 can be the same thickness. With the entire web 54, including the tabs 57 and the joints 58, made from flexible material, the webs 54 may fold, or overlap onto the sheets 53 or otherwise flex to reduce the value of the width $W_{UM}$ in the z direction to permit the two adjacent sheets 53 of the pair 50 to move directly toward each other in the direction of the z axis to reduce the value of the width $W_{UM}$ to the lesser folded width $W_{FM}$ (FIG. 12B) of the mudule 37-2. With the sheets 53 made from flexible material, the sheets 53 may also fold or overlap onto themselves or otherwise flex to reduce the value of the unfolded length $L_{UM}$ thereof in the x direction (referred to as "double folding").

For purposes of description, any such folding or overlapping or otherwise flexing of the tube settler module 37-2 is referred to as "folding". In connection with the webs 54, such folding is effective to reduce the unfolded width $W_{UM}$ (FIG. 12A) to that shown as $W_{FM}$ (FIG. 12B), the folded width across the module 37-2 in the z direction. In connection with the sheets 53, such folding is effective to reduce the unfolded length $L_{UM}$ of the module 37-2 (FIG. 12A) to that shown as $L_{FM}$ (FIG. 12B), the much shorter length in the x direction (as compared to the length $L_{FD}$ shown in FIG. 6A of the embodiment 37-1).

Cross Section of Tubes 39

Figure 7:
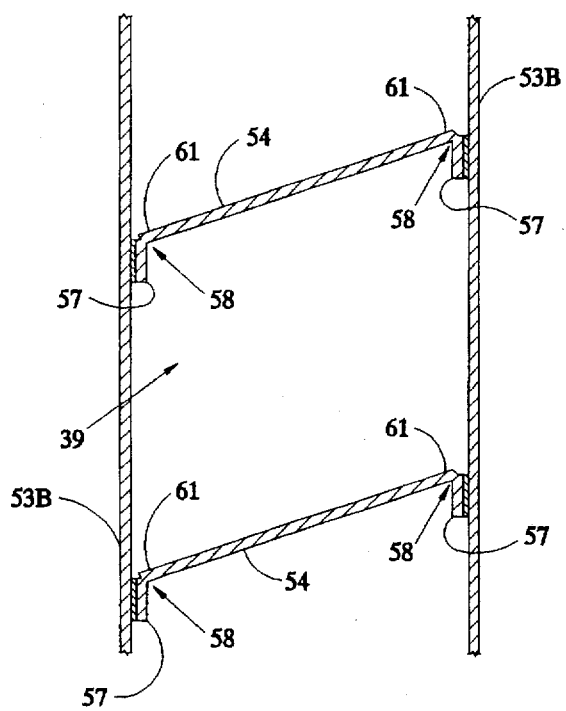
FIG. 7 is a cross sectional view of another embodiment of the tube settler module of the present invention showing one of the tubes open when the module is in an unfolded configuration and revealing a generally parallelogrammic cross section of the tube.
Figure 8:
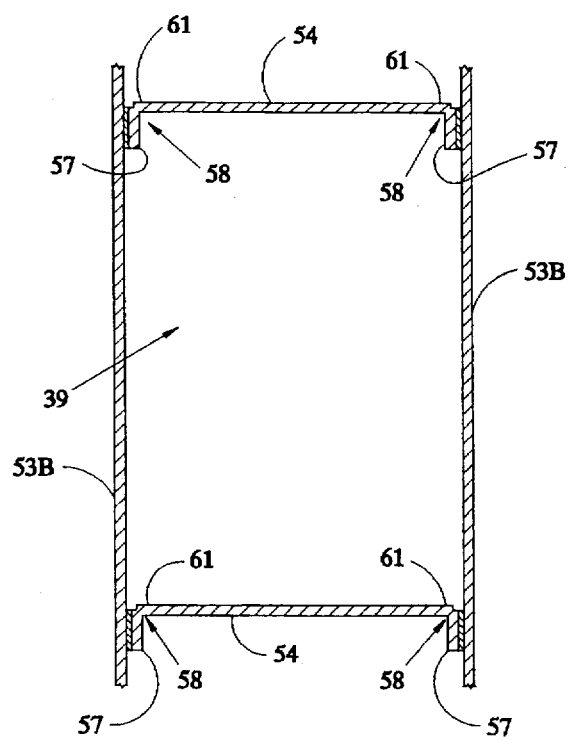
FIG. 8 is a cross sectional view of another embodiment of the tube settler module of the present invention showing one of the tubes open when the module is in an unfolded configuration and revealing a generally rectangular cross section of the tube.

The webs 54 may be secured to the sheets 53 (in the second embodiment) or to the beam sheets 53B (in the first embodiment) in various ways according to the nature of the solids 26 and the liquid 27 which are to flow in the tubes 39. For example, as shown in FIG. 5A, the overall cross section of the tube 39 with the tube settler module 37-1 in the unfolded configuration may be generally square, having 2 inch by 2 inch dimensions, for example, and generally 4 inch by 4 inch maximum dimensions. In another embodiment shown in FIG. 7, in such unfolded configuration the cross section of the tubes 39 may be in the form of a parallelogram having four inch by three inch dimensions, for example. As another example, in such unfolded configuration the cross section may be in the form of a rectangle having a length in the direction of the x axis longer than the width in the direction of the z axis, e.g., having three inch by two inch dimensions. Those skilled in the art may determine other cross sections and dimensions of the tubes 39 in accordance with the principles of the present invention to suit the solids 26 and the liquid 27 which are to flow in the tubes 39.

The Webs 54

The webs 54 include the central section 56 which, in the unfolded configuration, is a two-dimensional flow controller which interacts with the liquid 26 and the solids 27 to guide them in the diagonal paths shown by arrows 40 in FIG. 2A. The tabs 57 of the webs 54 may be elongated as shown in FIG. 3A to provide a maximum length for the bonds 59 to secure the webs 54 to the sheets 53 or to the beam sheets 53B. These tabs 57 are integral with and connected to the sides 61 of the central section 56 by the joints 58. When it is desired to use less material for the webs 54, the short tabs 57S shown in FIG. 4A may be used. The short tabs 57S are also integral with and secured to the sheets 53 or to the beam sheets 53B by the joints 58. The bonds 59 are formed between the tabs 57 and the sheets 53, or the beam sheets 53B, to secure the tabs 57, and thus the webs 54, to such sheets.

Figure 13:
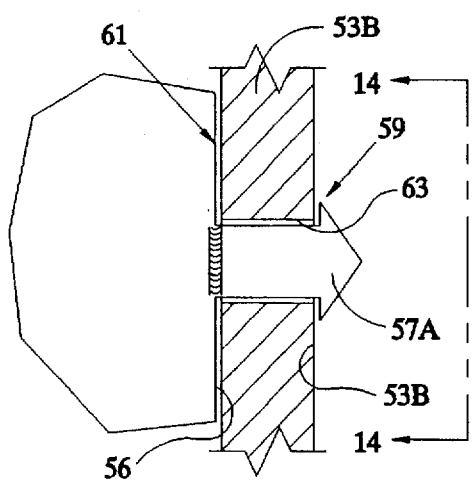
FIG. 13 is a cross-sectional view of another embodiment of the tabs of the present invention showing a generally arrow-head shaped tab extending through a slot in a beam sheet to hold the web secured to the tab to the beam sheet and permit folding of the tube settler module into the folded, closed-tube configuration.
Figure 14:
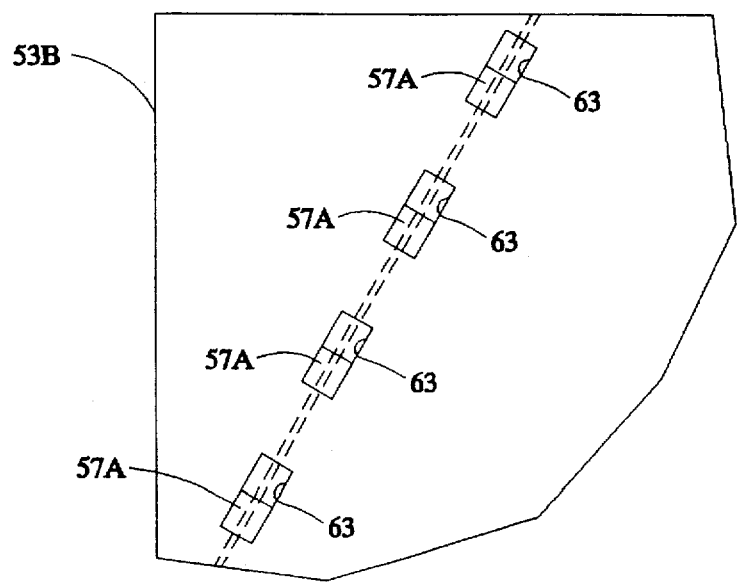
FIG. 14 is a side view of the beam sheet of FIG. 13 showing many of the tabs positioned along a diagonal line and extending through the slots shown in FIG. 13 to hold the webs extending in the diagonal direction shown in FIGS. 2A and 2B.

An alternative form of bond 59 is to provide the tab 57 in the form of the generally-arrowhead shaped member 57A shown in FIGS. 13 and 14. To secure an arrowhead-shaped tab 57A to one of such sheets 53B, such sheet 53B is provided with a slot 63 that is shorter than the width of the widest portion of the arrowhead-shaped tab 57A (FIG. 13). The arrow-head shaped tab 57A is compressed or deformed when the tab 57A is forced into and through the slot 63.

Once the arrowhead-shaped tab 57A has passed completely through the slot 63, the tab 57A returns to its original shape to be retained in the slot 63, and thus retain the web 54 secured to the sheet 53B.

The joints 58 of the first embodiment 37-1 of the module 37 are shown in detail in FIGS. 5A, 5B, 6A and 6B. Enlargements of the joints 58 are shown in FIGS. 5B and 6B. Each joint 58 is between one of the tabs 57 and the central section 56 of the web 54. In a preferred embodiment of the present invention, each joint 58 may be a so-called "living-hinge". The living hinge joint 58 is formed integrally with the tab 57, and has a thickness that is reduced from the thickness of the tab 57 to form a thin, flexible joint section 66. The joint section 66 has the characteristic of being easily bendable through 180 degrees onto itself. This allows the web 54 to move into the folded configuration shown in FIGS. 6A and 6B, and to bend back into the unfolded configuration shown in FIGS. 5A and 5B. The flexible joint section 66 is strong enough to have the structural integrity necessary to keep the tab 57 connected to the central section 56 against the force of the pressure of the liquid 26 and the solids 27 flowing in the tube 39.

As described above, in normal manufacturing operations for creating the bonds 59, there is some variation in the angle D (FIG. 2A) at which the diagonal bond 59 extends along the side 61 of any one of the webs 54. With this variation, there may be some twisting of the tabs 57 as the joint 58 flexes during the folding operation to enable the tube settler module 37 to assume the folded configuration; and some similar twisting of the tabs 57 as the joint 58 flexes during the unfolding operation to enable the tube settler module 37 to assume the unfolded configuration. The elongated joint 58 shown in FIG. 4B may be used to permit such twisting, so that the axes 62 of the joints are parallel.

The sheets 53, and the beam sheets 53B, and the webs 54, including the central sections 56 and the tabs 57, may be made from plastic material, such as ABS or PVC or polyethylene, having a thickness of from 0.20 to 0.30 inch. Such material with such thickness has the strength necessary for forming the joint 58 with the above-described flexibility to have the above-described bending characteristics to enable the tube 39 to fold and unfold as described above. The living hinge embodiment of the joint 58 may be formed from such material by reducing the 0.30 inch thickness at the location of the joint to from 0.20 to 0.15 inches.

Alternately, the sheets 53, and the beam sheets 53B, and the web 54, including the central sections 56 and the tabs 57, may be made from cold rolled sheet stainless steel having a thickness of from 7 to 10 mils. Stainless steel having such thickness has the strength necessary for forming the joint 58 with enough flexibility to have the above-described bending characteristics to enable the tube 39 to fold and unfold as described above. The living hinge embodiment of the joint 58 may be formed from stainless steel by reducing the 7 to 10 mil thickness at the location of the joint 58 to from 3 to 5 mils.

Alternately, the sheets 53, and the beam sheets 53B, the webs 54, including the central sections 56 and the tabs 57, may be made from sheet aluminum having a thickness of 10 mils. Sheet aluminum having such thickness has the strength necessary for forming the joint 58 with enough flexibility to have the above-described bending characteristics to enable the tube 39 to fold and unfold as described above. The living hinge embodiment of the joint 58 may be formed from sheet aluminum by reducing the 0.010 mil thickness at the location of the joint to from 5 to 7 mils.

The manner in which the bonds 59 are made depends on the material from which the sheets 53 and the webs 54 are made. For example, when the sheets 53, and the beam sheets 53S, and the webs 54, including the central sections 56 and the tabs 57, are made from PVC plastic, the bond 59 is made by using glue such as methylene chloride, or ultrasonic welding. When the sheets 53, and the beam sheets 53B, and the webs 54, including the central sections 56 and the tabs 57, are made from sheet stainless steel or aluminum, the bond 58 is made by welding.

Tube Settler Module 37

Figure 9:
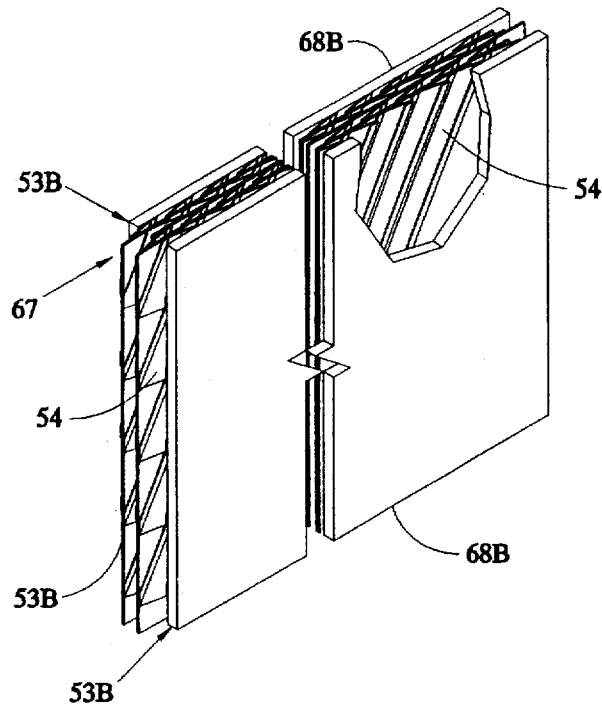
FIG. 9 is a three dimensional view of an embodiment of a folded tube settler module of the present invention showing side sheets for spanning the trusses shown in FIG. 1B, wherein the side beam sheets are made of thicker material than sheets between such side sheets to provide support to span the distance between such trusses.

One of the tube settler modules 37-1 or 37-2 may comprise many (e.g. 13) sheets 53 or 53B, and many webs 54 (e.g., 12) extending between each pair 50 of such sheets (FIG. 2C). Adjacent pairs 50 of such sheets 53, or beam sheets 53B, and the corresponding webs 54, may be made as described above and are said to form a row 67 of tubes 39 of the tube settler 25. The tube settler module 37 may include outer sheets 68, or outer beam sheets 68S, and may include up to eleven inner sheets 53, or beam sheets 53B. The outer sheets 68 of the second embodiment 37-2 may be made from the same thickness material as is used to fabricate the inner sheets 53. As shown in FIG. 9, for spanning increased distances between the trusses 42 in the self-supporting manner described above, for example, the thickness of each of the outer beam sheets 68S may be 30 mils when PVC plastic material is used, or somewhat more than ten mils when sheet stainless steel is used, or somewhat more than ten mils when sheet aluminum is used.

Figure 2D:
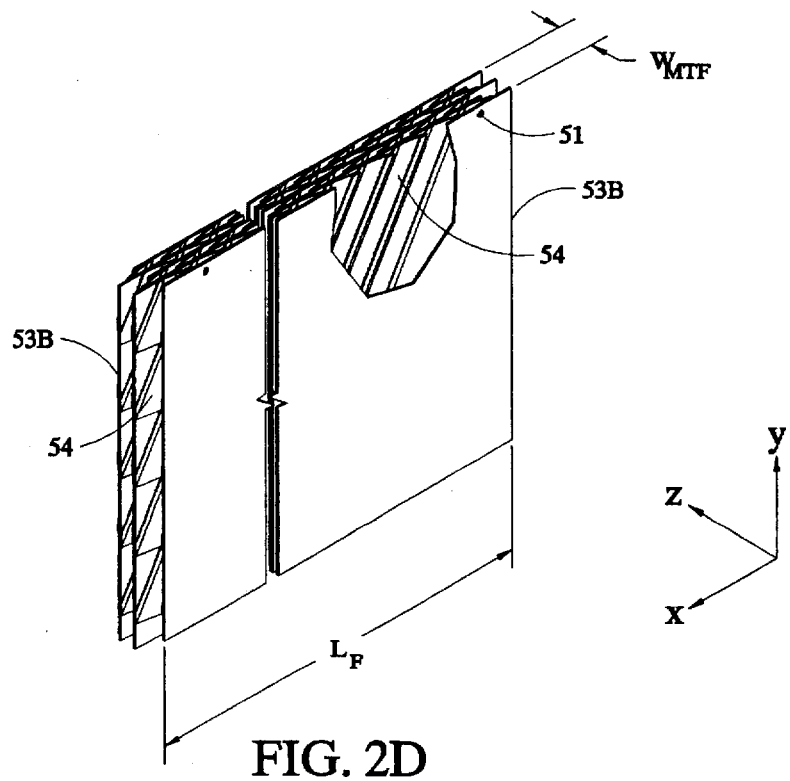
FIG. 2D is an enlarged view of the entire settler module shown in FIG. 2C, wherein each of the portions is shown folded so that the width of the tube settler module is substantially less than that of the width of the unfolded tube settler module shown in FIG. 2C.

As shown in FIGS. 2C and 9, to form the many rows 67 of the tube settler module 37-1, the inner beam sheet 53B of the pair 50 (FIG. 2A) of beam sheets 53 shown in FIG. 2A is assembled with another series of webs 54, and those webs 54 are assembled to the next beam sheet 53B. This forms the next, or second row 67. This process is repeated until the entire tube settler module 37-1 shown in FIGS. 2C and 2D is fabricated with the desired number of rows 67 of tubes 39. Such tube settler module 37-1 may have a width $W_{MTU}$ (FIG. 2C) in the direction of the z axis of about 4 feet, for example. As the process of joining adjacent rows 67 is performed, the webs 54 of one row 67 may be joined to the beam sheets 53B in one diagonal direction as illustrated by the first row of tubes 39 shown in FIG. 2C. The webs 54 of the next, or second, row 67 of tubes 39 may be joined to the beams sheets 53B in the same (not shown) or the opposite diagonal direction shown in FIG. 2C, where the angle D of the diagonal direction may be 55 to 60 degrees from horizontal as described above. In this manner, if one row 67 of tubes 39 has a folded width $W_F$, then the overall folded width of the tube settler module 37-1 is $W_{MTF}$, where $W_{MTF}$ is n times $W_F$ and n is the number of rows 67 of tubes.

Figure 15:
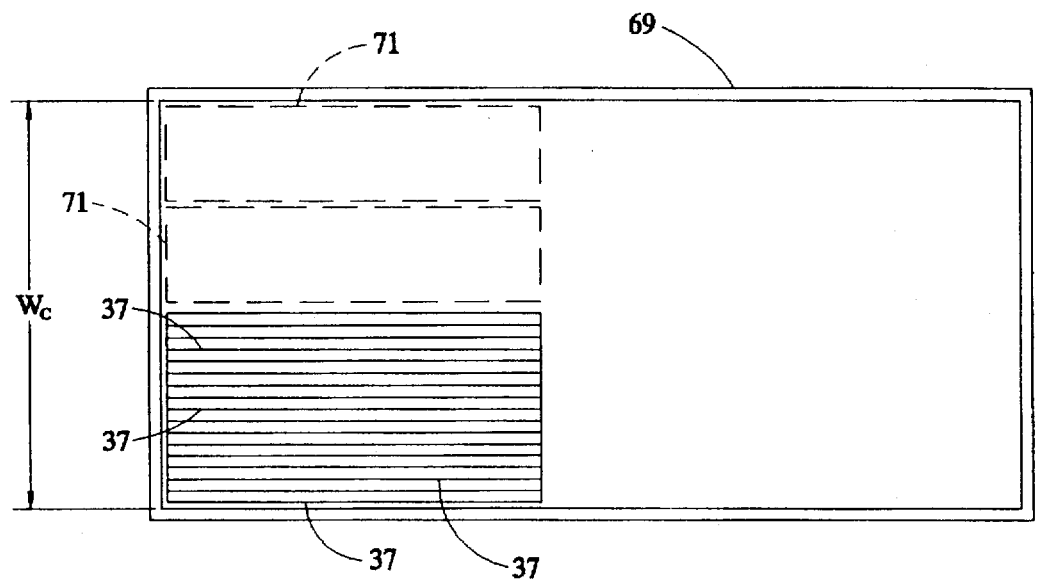
FIG. 15 is a plan view of the increased numbers of tube settler modules of the present invention (solid lines) which may be received in a container for shipment, as compared to the fewer standard tube settler modules (dashed lines) which may be received in such container.

In the folded configuration of such tube settler module 37-1 having many rows 67 of tubes 39, the width $W_{MTF}$ of the entire folded tube settler module 37-1 (FIG. 2D) measured in the third dimension of the axis z is substantially less than a width $W_{MTU}$ of the same tube settler module 37-1 (FIG. 2C) in the unfolded configuration. The same applies to the embodiment 37-2 of the tube settler module 37. In the first embodiment 37-1, for example, the unfolded dimension (or width $W_{MTU}$) along the z axis of the entire module 37-1 is substantially greater (e.g., ten times) than the width $W_{MTF}$ of the entire module 37-1 in the folded configuration. As a result, as shown in FIG. 15, many times more tube settler modules 37 of the present invention (shown in solid lines) may be contained in the same width $W_C$ of a shipping container 69 as compared to the number of standard (non-foldable) tube settler modules 71 (shown in dashed lines).

Moreover, the foldable characteristic of the tube settler modules 37 of the present invention enables such modules 37 to be installed in basins 30 which have access ports (not shown) provided with relatively small openings for service and cleaning of the settler 25. Such access ports would generally not receive the standard tube settler module 71 having a ten foot (length) by three and one-half foot (height) by four foot (width) size. However, a tube settler module 37 in the form of the first embodiment 37-1 of the present invention, having a ten foot (length) by three and one-half foot (height) by three inch width (about one-tenth of an unfolded two foot width) size in the folded configuration would be more likely to fit through such an access port, and could then be unfolded into its open-tube configuration for installation in the basin 30.

Further, a tube settler module 37 in the form of the second embodiment 37-2 of the present invention with canvas material used for the webs 54 and the sheets 53, for example, and having a five foot length by three and one-half foot height by five inch width size in the double folded configuration, would fit through an even smaller access port, and could then be unfolded into its open-tube configuration (FIG. 12A) for installation in the basin 30.

Handling the Tube Settler Modules 37

Figure 10:
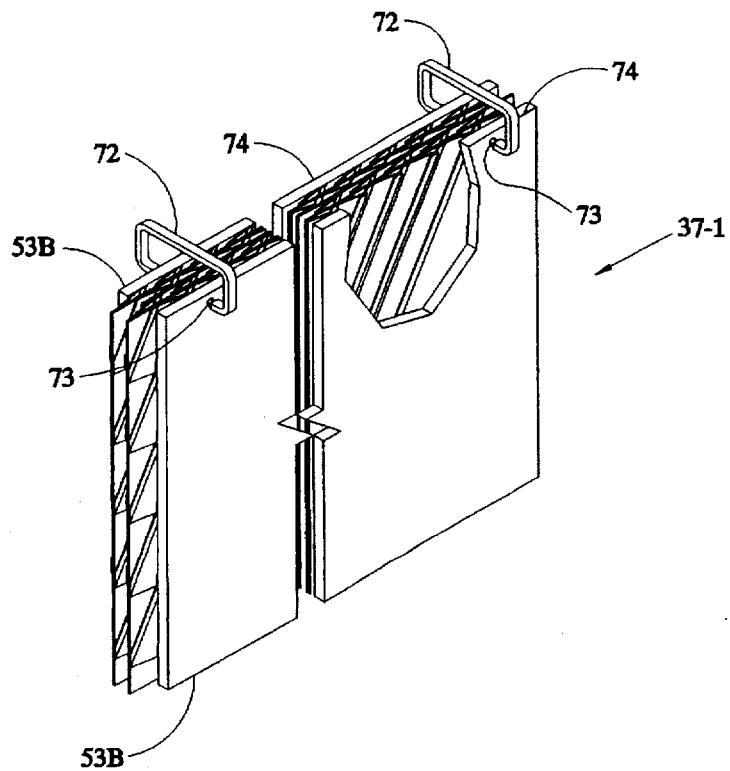
FIG. 10 is a view similar to FIG. 9 showing one embodiment of handles for carrying the tube settler module when it is in the folded configuration.

Another aspect of the present invention is that the individual tube settler modules 37 are relatively easy to handle for installation due to the smaller width dimension $W_{MTF}$ (FIG. 2D). For example, in FIG. 10 the tube settler module 37-1 is shown in the folded configuration, and handles 72 are provided extending into apertures 73 provided along the top edge 74 of the sheets 53 of the module 37-1. With the module 37-1 fabricated from sheets 53B of PVC plastic having a thickness of 30 mils and twelve rows 67 (FIG. 9), a module 37 having an unfolded size of ten feet by three and one-half feet by two feet would weigh about 200 pounds, and yet would have a folded size of ten feet by three and one-half feet by about three inches. The folded size is small enough and light enough to be carried by two workers to facilitate shipping or carrying at the installation site.

Figure 11:
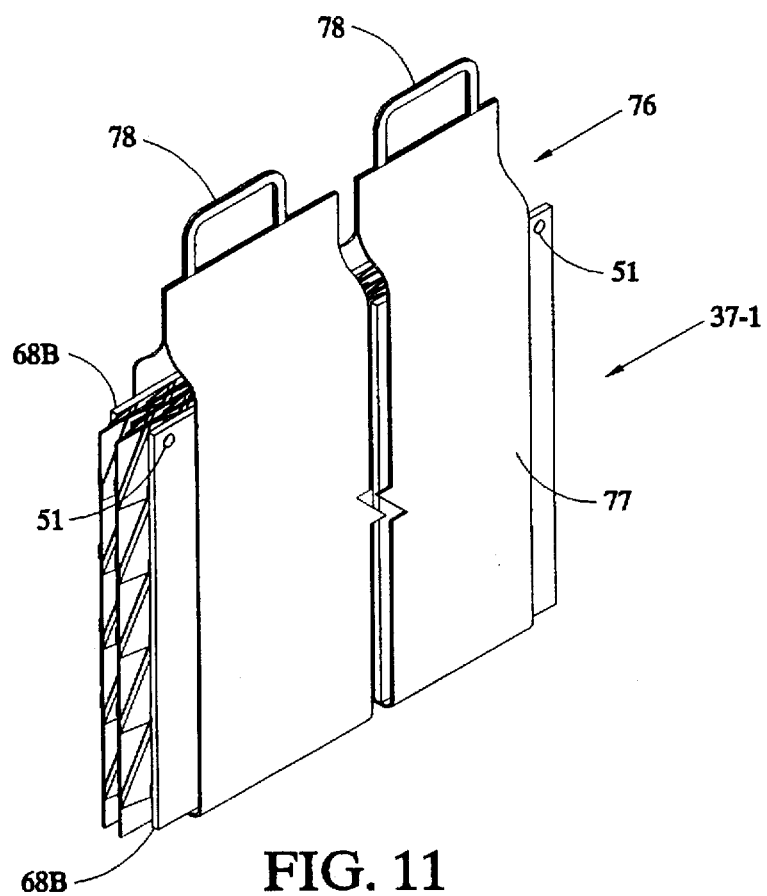
FIG. 11 is a view similar to FIG. 10 showing another embodiment of a handle for carrying the tube settler module when it is in the folded configuration.

Alternatively, as shown in FIG. 11, handles 76 may be provided in the form of a shrink-wrap plastic retainer 77 extending completely around the module 37-1 with integral handles 78. The handles 72 of FIG. 10, and the retainer 77 and handles 78 of FIG. 11, are strong enough to resist any tendency of the folded tube settler module 37-1 to become unfolded, and the handles 72 and 78 facilitate carrying of the module 37-1.

Upon completion of the transport and carrying of the module 37-1 to the place of installation, either the handles 72 (FIG. 10), or the retainer 77 and handle 78 (FIG. 11), are removed from the module 37-1; allowing the module 37-1 to unfold according to the characteristics of the particular materials from which the module 37-1 is fabricated. The outer beam sheets 68B may be urged apart for completing the unfolding operation. A tie rod 49 of the truss 42 shown in FIG. 1A is then extended through each aperture 51, such as a grommet, provided near the corner of each beam sheet 53B and 68B. The tie rod 49 secures the assembled and unfolded tube settler module 37-1 on the pipe 46 that is below the tube settler module 37-1. The self-supporting characteristics of the outer beam sheets 68B enable the tube settler module 37-1 to span the adjacent trusses 42 without other support. The tie rod 49 acting on the apertures 51 keep the beam sheets 53B and 68B of the module 37-1 apart so that the module 37-1 stays unfolded with the tubes 39 open to receive the flowing liquid 27P and the solids 26.

Second Embodiment 37-2 of Tube Settler Module 37

Figure 12B:
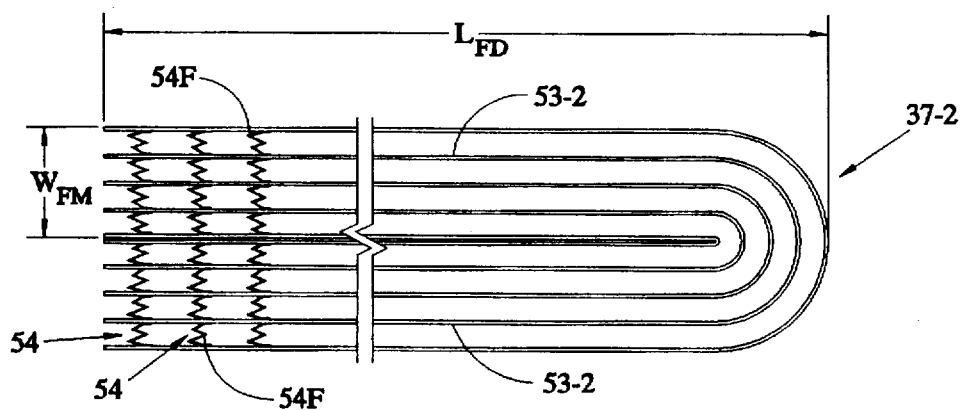
FIG. 12B is a three dimensional, schematic view of the embodiment of the tube settler module shown in FIG. 12A, in which the eyelets have been disconnected from the supports and all of the flexible elements of the module have been folded so that the tube settler module is in the folded configuration for shipment.

Referring in detail to FIGS. 12A and 12B, there is shown the second embodiment 37-2 of the tube settler module 37 having all of the sheets 53, all of each web 54, and the joints 58 of each web 54, made from flexible material. With the entire web 54, including the tabs 57 and the joints 58, made from flexible material, the webs 54 may fold, or overlap, onto the sheets 53 or otherwise bend or flex to reduce the value of the width $W_{Um}$ of the module 37 in the z direction to permit the two adjacent sheets 53 of the pair 50 to move directly toward each other in the direction of the z axis to reduce the value of the width $W_{UM}$ to the lesser folded width $W_{FM}$ (FIG. 12B) Of the module 37. The sheets 53 may also bend or fold or overlap onto themselves or otherwise flex to reduce the value of the unfolded length $L_{UM}$ in the x direction to the double folded length $L_{FD}$ shown in FIG. 12B.

With the sheets 53, the webs 54, and the joints 58 made from flexible material, additional structure of the tube settler module 37-2 is provided to enable the module 37-2 to remain in the desired unfolded configuration when immersed in the liquid 27 and the solids 26 for settling the solids 26. In particular, the tie rods 49 which extend through the apertures 51 are provided with spacers 82. The spacers 82 may be in the form of tubes or hollow rods into which the tie rods 49 are placed as the tie rods 49 are extended through the various apertures 51 of the sheets 53 of the tube settler module 37-2. One of the spacers 82 is provided between each pair 50 of the sheets 53 to keep the sheets 53 spaced by a desired amount so that in the unfolded configuration, the width $W_{UM}$ of the module 37-2 is the full amount allowed by the webs 54.

The opposite tie rods 51 apply opposite forces in the direction of the x axis to the corners 81 of the sheets 53 to urge the sheets 53 to their full length $L_{UM}$ and minimize the catenary of the top edge of the sheets 53. To assist in keeping the sheets 53 extended to the full length $L_{UM}$, and to the full height H, pockets 83 are sewn or otherwise formed in the sheets 53 on the outside of the module 37. The pockets 83 extend in the directions of both the x and the y axes and are dimensioned to receive and retain elongated rigid members 84, such as battens. The battens 84 assist in holding each sheet 53 unfolded in both such directions. The pockets 83 are spaced so that the there is no batten 84 at intervals to enable the sheets 53 to be folded at such intervals as the tube settler module 37-2 assumes the folded configuration.

The sheets 53 and the webs 54, including the tabs 57 and the joints 58, of the second embodiment 37-2 of the tube settler module 37 may be made from the plastic material described above, and have a thickness suitable for achieving the desired flexibility to permit the above-described bending, flexing and folding. For example, when PVC is used as such material for the sheets 53 and the webs 54, including the tabs 57 and the joints 58, of the tube settler module 37-2, the PVC has a thickness of from 0.15 to 0.2 mils. Each such part of the embodiment 37-2 may be made from other suitable material, such as canvass, which is capable of being sewn or otherwise bonded or secured in place as described above.

Also, with the PVC or canvass or other flexible material used for making the sheets 53 and the webs 54, the joints 58 and the tabs 57 may be made as one member and bonded to the sheets 53 and the webs 54 as described above. Alternatively, the webs 54 and the sheets 53 may be sewn or otherwise bonded directly to each other without use of the separate tabs 57 or joints 58, such that the sewn or bonded areas (not shown) form structure similar to the tabs 57 and the joints 58.

The foregoing description of the present invention illustrates and describes the invention and is not intended to limit the invention to the form disclosed herein. The embodiments disclosed are intended to describe the best modes known of practicing the present invention and to enable others skilled in the art to use such invention in such or other embodiments. It is intended that the appended claims be interpreted so as to include alternative embodiments to the extent permitted by the prior art.

What is claimed is:

1. A foldable tube settler module assembly for a module of settler tubes which settles solids from liquid, said module having a minimum thickness for shipment and a normal thickness for use in settling the solids, said minimum thickness being substantially less than said normal thickness, said tubes being defined by four opposing walls, said assembly comprising:

a pair of sheets, each of said sheets having dimensions along major and minor orthogonal axes, said axes being perpendicular to the direction of said thickness, said sheets defining two of said walls of one of said tubes; and an interconnect member having a central section defined by opposite sides, and a flex joint on each of said opposite sides and securing each of said sides of said central section to a respective one of said sheets to form another wall of one of said tubes, said another wall extending from each of said sheets in the direction of said thickness of said module when said tube is open to receive the liquid and the solids;

each of said flex joints being flexible to permit relative angular movement between said respective central section and said sheets to allow said sheets to move toward each other and change the direction in which said another wall extends, said changed direction being generally parallel to said sheets to provide said minimum thickness for shipment.

2. A foldable assembly according to claim 1, further comprising:

said interconnect member being a first interconnect member of said assembly; and a second said interconnect member;

said flex joints of said second interconnect member flexibly securing each of said central sections of said second member to a respective one of said sheets spaced from and generally parallel to said central section of said first member to form a fourth wall of one of said tubes, said fourth wall also extending from each of said sheets in the direction of said thickness of said module when said tube is open to receive the liquid and the solids, each of said flex joints of said second interconnect member also being flexible to permit relative angular movement between said respective second central section and said sheets to allow said sheets to move toward each other and change the direction in which said fourth wall extends, said changed direction being generally parallel to said sheets to provide said minimum thickness for shipment.

3. A foldable assembly according to claim 2, further comprising:

each of said flex joints securing said central sections of said members to extend diagonally between said sheets to provide for said settlement of said solids from said liquid.

4. A foldable assembly according to claim 2, further comprising:

each of said sheets and said members being made from material that is rigid relative to the flexibility of said flex joints to render said members effective to position said sheets apart by a first distance in said thickness direction to provide said open tube; and said relative angular movement between each said respective central section and said sheets permitted by said flex joints being effective to reduce said first distance to a second distance, wherein said second distance is substantially less than said first distance to provide said minimum thickness for shipment.

5. A foldable assembly according to claim 2, further comprising:

said sheets having opposite ends in the direction of said major axis, said sheets being made from material that is rigid relative to the flexibility of said joints so as to be self-supporting between said opposite ends so that when said module has said normal settling thickness said sheets support said first and second interconnect members with said tube open to receive the liquid and the solids.

6. A foldable assembly according to claim 5, wherein said liquid and said solids are contained in a basin having opposite side walls, further comprising:

a support structure having spaced truss sections each of which spans said side walls;

each of said opposite ends of said sheets being mounted on a respective one of said spaced truss sections in said liquid and solids in said basin and being secured to said support structure with said tube open to receive the liquid and the solids.

7. A foldable assembly according to claim 5, further comprising:

said material from which said sheets are made being stainless steel, plastic or aluminum.

8. A foldable assembly according to claim 2, further comprising:

each of said sheets having an upper edge extending in the direction of said major axis; and at least one handle secured to said sheets adjacent to said respective upper edges, said handle being adapted to lift said assembly when said interconnect members are parallel to said sheets and said module has said minimum thickness.

9. A foldable assembly according to claim 2, further comprising:

each of said sheets being flexible to permit said sheets to be folded to reduce the value of the dimension of said assembly in the direction of said major axis.

10. A foldable assembly according to claim 1, further comprising:

said interconnect member being a first interconnect member;

a second said interconnect member having additional flex joints flexibly securing each of said central sections of said second member to a respective one of said sheets, said additional flex joints positioning said second section to extend diagonally between said sheets along a path parallel to said first member;

said members being made from material that is rigid relative to the flexibility of said joints to render said first and second interconnect members effective to position said sheets apart by a first distance in a folded configuration and by a second distance in an unfolded configuration, said first and second distances being in the direction of said thickness;

said flexibility of said flex joints of said first and second members permitting movement between said sheets in the plural directions of said major axis and said minor axis to permit said module to assume said folded configuration and to permit reverse movement between said sheets in said directions of said major axis and said minor axis to permit said module to assume said unfolded configuration in which said tube is open for receiving the liquid and the solids.

11. A tube settler module having a folded configuration for shipment and an unfolded configuration for settling solids from liquid, said tube comprising:

a pair of sheets, each of said sheets being of generally two dimensions and having a major axis and a minor axis, said axes being orthogonal;

a first interconnect member comprising:
a first central flow section having opposite edges,
a first tab at each edge of said first section, and
a first flex joint joining each of said first tabs to a respective one of said edges of said first central section;

a first bond between each of said first tabs and a respective one of said sheets, each of said first bonds positioning said first section to extend between said sheets diagonally relative to said major and minor axes;

a second interconnect member comprising:
a second central flow section having opposite edges,
a second tab at each edge of said second section, and
a second flex joint joining each of said second tabs to a respective one of said edges of said second central section; and a second bond between each of said second tabs and a respective one of said sheets, each of said second bonds positioning said second section away from said first section in the direction of said major axis and extending between said sheets generally parallel to said first section;

said first and second bonds assembling said first and second interconnect members with said sheets to form said tube which is open in said unfolded configuration to receive the liquid and the solids;

said first and second flex joints being flexible to permit relative movement of said sheets toward each other to permit said tube to assume said folded configuration in which said tube is closed, and to permit relative movement of said sheets away from each other to permit said tube to assume said unfolded configuration in which said tube is open to receive the liquid and the solids;

said sheets being spaced by a first distance in said folded configuration and by a second distance in said unfolded configuration, said first distance being substantially less than said second distance.

12. A foldable assembly according to claim 11, further comprising:

each sheet of said pair of sheets and said interconnect member being made of flexible material and having therein a series of spaced elongated members and apertures provided therein at the upper opposite corners.

13. A tube settler module according to claim 11, further comprising:

said flexibility of said flex joints further permitting relative movement of said sheets in the plural directions of said major axis and said minor axis to permit said tube to assume said folded and unfolded configuration.

14. A multi-row foldable tube settler module according to claim 13, further comprising:

a third one of said sheets;

a further plurality of said first and second elongated interconnect members; and a plurality of third and fourth bonds between each of said respective tabs of said further plurality of said first and second elongated interconnect members and said respective second sheet and said third sheet, said third and fourth bonds positioning said central sections of said further plurality of said first and second elongated interconnect members to extend between said second and third sheets diagonally relative to said major and minor axes and either in the same or an opposite diagonal direction to form a second row of said foldable tubes.

15. A tube settler module according to claim 13, further comprising:

said diagonal direction at which said at least two interconnect members are bonded to a respective one of said pair of beam sheets being substantially the same as said diagonal direction at which said at least two additional interconnect members are bonded to a respective one of said pair of beam sheets and said at least one additional beam sheet.

16. A tube settler module according to claim 11, further comprising:

a plurality of said first and second interconnect members; and a plurality of said first and second said bonds bonding said plurality of said first and second interconnect members to said pair of sheets to form a row of said foldable tubes.

17. A tube settler module having at least one foldable tube, wherein said tube is foldable between a closed, flat configuration for shipment, and an open, settling configuration to receive liquid and particles to be settled; said tube settler module comprising:

a pair of beam sheets, each of said beam sheets being of generally two dimensions and having a major axis and a minor axis, each of said beam sheets being made of a rigid material; and at least two elongated interconnect members each having a central flow section made of rigid material and having opposite sides, at least one tab for each said side of said central section, and a joint connecting each of said tabs and a respective one of said sides of said central section, each said joint being made of a material that is flexible as compared to said rigid material;

each of said tabs being bonded to a respective one of said beam sheets with said members extending in a direction diagonal to both of said axes, said tabs of one of said members being aligned parallel to said tabs of said other of said members so that said flow sections of said at least two members are aligned to define said at least one tube;

said flexible joints being sufficiently flexible to permit relative movement of said beam sheets with respect to each other along both said major axis and said minor axis and toward each other into an offset overlapping position to position said at least one tube in said closed, flat configuration for shipment, and to permit reverse relative movement of said beam sheets with respect to each other oppositely in said directions of said major axis and said minor axis and away from each other into an aligned overlapping position to transform said at least one tube into said open, settling configuration.

18. A tube settler module according to claim 17, further comprising:

each of said flexible joints being sufficiently flexible so that upon said relative movement between said beam sheets along both said major axis and said minor axis and toward each other into said offset overlapping position said central sections are generally parallel to said sheets to flatten said at least one tube; and each of said flexible joints being sufficiently flexible so that upon said reverse relative movement between said beam sheets along both said major axis and said minor axis and away from each other into said aligned overlapping position said central sections are generally perpendicular to said sheets to transform said at least one tube into said open, settling configuration.

19. A module according to claim 17, further comprising:

at least one additional one of said beams sheets; and at least two additional ones of said elongated interconnect members;

each of said tabs of said two additional ones of said interconnect members being bonded to a respective one of said pair of beam sheets and said at least one additional beam sheet in a direction diagonal to both of said axes, said tabs of one of said additional members being aligned with said tabs of said other of said additional members so that said flow sections thereof are aligned to define additional ones of said at least one foldable tube.

20. A tube settler module according to claim 19, further comprising:

said diagonal direction at which said at least two interconnect members are bonded to a respective one of said pair of beam sheets being opposite to said diagonal direction at which said at least two additional interconnect members are bonded to a respective one of said pair of beam sheets and said at least one additional beam sheet.

21. A tube settler module according to claim 17, further comprising:

each of said beam sheets having an end spaced apart from the other end on said major axis;

a handle secured to at least one of said beam sheets at each of said ends to facilitate lifting of said module when said at least one tube is in said collapsed flat configuration.

22. A tube settler module according to claim 17, wherein said liquid and said particles are received in a basin having spaced side walls, further comprising:

a truss having spaced sections each of which spans said side walls, each of said sections being provided with a brace;

each of said beams sheets having opposite ends, said opposite ends being mounted on a respective one of said spaced sections in said liquid and particles in said basin and being secured to said brace in said settling configuration so that said at least one foldable tube is open and positioned to receive said liquid and particles.

23. A foldable tube settler module for settling particulates from particulate-laden liquid, said module having a primarily two-dimensional configuration in a folded condition and having an foldable third dimension, said module having a three-dimensional configuration in a settling condition wherein said third dimension is increased to allow flow of said particulate-laden liquid into said module, said module comprising;

a plurality of beam sheets, each of said sheets extending in two dimensions along a major axis and a minor axis, each of said sheets being made of rigid material; and between adjacent pairs of said beam sheets, a plurality of elongated members each having a web section made of rigid material and having opposite sides, each said member having a tab at each said side of said web section, each said member having a joint between each of said tabs and a respective one of said sides of said web section, each said joint being made of a material that is relatively flexible as compared to said rigid material;

each of said tabs of a given one of said members being bonded to a respective one of said beam sheets in a direction diagonal to both of said axes;

said web sections of said module having said three-dimensional configuration being generally perpendicular to said beam sheets;

said joints of a particular one of said members being sufficiently flexible to permit relative movement of said beam sheets of said pair, said relative movement being along both said major axis and said minor axis and toward each other into a position in which said web sections are generally parallel to said beam sheets of said pair of sheets to reduce the value of said third dimension and allow said tube settler module to be in said folded condition;

adjacent ones of said web sections that are generally perpendicular to said pair of beam sheets, and said beam sheets to which said adjacent ones of said sections are bonded, being effective to define a plurality of flow paths for guiding said particulate-laden liquid in said diagonal direction to promote settling of the particulates.

24. A tube settler having a tube unit expandable from a first configuration having a first volume to a second configuration defining a second volume larger than the first volume for receiving particulate-bearing liquid; said tube settler comprising:

a plurality of beam sheets, each of said sheets being of generally two dimensions and having a major axis and a minor axis, each of said beam sheets having opposite ends extending in the direction of said minor axis and an aperture adjacent to each of said ends;

an elongated interconnect between each beam sheet of each said pair of said beam sheets, each said interconnect having a central section, an elongated tab at each side of said section, and a joint joining each of said tabs to a respective one of the sides of said central section;

a bond between each of said tabs and a respective one of said beam sheets, each of said bonds positioning said section to extend diagonally between said beam sheets of one of said pairs and to position said beam sheets of said pair apart by a first distance in said first configuration of said settler module and by a second distance in said second configuration of said settler module;

said joints being flexible to permit movement of said beam sheets toward each other to reduce said second distance wherein said tube settler module may assume said first configuration, and to permit movement of said beam sheets away from each other wherein said tube settler module may assume said second configuration;

a first tie rod extending through said apertures of each of said beam sheets adjacent to one of said ends;

a second tie rod extending through said apertures of each of said beam sheets adjacent to the other of said ends; and a support connected to said tie rods to hold said beams sheets with said tube settler in said second configuration and said interconnects defining a plurality of flow paths extending diagonally between adjacent ones of said beam sheets for receiving said liquid and settling said particulates from said liquid.

25. A settler for removing particulates from liquid, said settler having a tube settler unit expandable from a portable configuration having a first volume to an enlarged configuration having a second volume larger than the first volume, said settler being adapted to be mounted across a clarifier basin for receiving particulate-bearing liquid, said settler comprising:

a support having spaced truss sections, each of said truss sections extending across said basin;

said tube settler unit comprising:

a plurality of beam sheets, each of said sheets being of generally two dimensions and having a major axis and a minor axis, each of said beam sheets having an extremity extending in the direction of said minor axis and an aperture extending therethrough adjacent to each of said extremities, said beam sheet extremities being adapted to be mounted on respective ones of said spaced support sections with said beam sheets spanning said basin and said second dimension extending vertically;

a plurality of interconnects between two adjacent ones of said beam sheets, each said interconnect having a central section and a joint flexibly securing said central section to a respective one of said adjacent beam sheets, each of said joints positioning said central section to extend diagonally between said adjacent beam sheets;

said beam sheets and interconnects joined thereto defining said tube settler unit extending in said directions of said major and minor axes and having a width in a third direction perpendicular to each of said directions of said major and minor axes;

said joints being flexible to permit movement between said adjacent beam sheets toward each other to reduce the width of said settler unit in said third dimension in said portable configuration and to permit said width to be increased to define said enlarged configuration;

a first tie rod extending through said apertures of each of said beam sheets adjacent to one of said extremities; and a second tie rod extending through said apertures of each of said beam sheets adjacent to the other of said extremities;

said tie rods holding said settler unit on said support with said interconnects and said beam sheets defining a plurality of tubular flow paths extending diagonally between adjacent one of said beam sheets.

26. A settler for removing particulates from liquid, said settler having a tube settler unit expandable from a first configuration having a first volume to a second configuration having a second volume larger than said first volume, said settler being adapted to be mounted across an upper portion of a clarifier basin having particulate-bearing liquid flowing therein, said settler comprising:

a truss having spaced truss sections provided with a horizontally extending unit support and a plurality of brackets extending from said unit support, each of said horizontally extending unit supports extending across said basin;

said tube settler unit comprising:

a plurality of beam sheets, each of said sheets being of generally two dimensions and having a horizontal axis and a vertical axis, each of said beam sheets having an extremity extending in the direction of said vertical axis and an aperture extending therethrough adjacent to each of said extremities, said beam sheet extremities being adapted to be mounted on respective ones of said unit supports with said beam sheets spanning said basin between said unit supports; and a plurality of webs between every two adjacent ones of said beam sheets, each of said webs having a flow section, an elongated flap at each end of said section, and a joint flexibly securing each of said tabs to a respective one of said ends of said flow section, each of said tabs being secured to a respective one of said adjacent beam sheets and extending diagonally between said adjacent beam sheets;

said beam sheets and webs secured thereto defining said tube settler unit extending in said directions of said horizontal and vertical axes and in a width direction perpendicular to each of said directions of said horizontal and vertical axes;

said joints being flexible to permit movement of said adjacent beam sheets toward each other in said width direction to reduce the width of said settler unit and to permit said width to be increased to define said second configuration;

a first tie rod secured to spaced ones of said brackets and extending through said apertures of each of said beam sheets adjacent to one of said extremities;

a second tie rod secured to spaced other ones of said brackets and extending through said apertures of each of said beam sheets adjacent to the other of said extremities;

said tie rods holding said settler unit on said unit supports in said second configuration with said webs and said beam sheets defining a plurality of tubular flow paths extending diagonally between adjacent one of said beam sheets.

27. A method of installing a tube settler in a basin in which there flows liquid and solids to be separated from the liquid, said method comprising the steps of:

assembling pairs of sheets and interconnects therebetween to define the tubes of said tube settler having flexible joints to permit said sheets to move relative to each other from a configuration in which said tubes are open and ready to receive the liquid and the solids to a configuration in which said tubes are closed ready for shipment to said basin;

folding said assembled sheets and interconnects into said configuration in which said tubes are closed ready for shipment to said basin;

shipping said folded sheets and interconnects to said basin;

unfolding said folded sheets and interconnects by moving said sheets apart into said configuration in which said tubes are open and ready to receive the liquid and the solids; and placing said unfolded sheets and interconnects in said tube-open configuration in said basin to receive the liquid and the solids.

* * * * *